United States Patent
Fujita et al.

(10) Patent No.: US 9,690,693 B2
(45) Date of Patent: Jun. 27, 2017

(54) STORAGE SYSTEM, STORAGE APPARATUS, AND COMPUTER PRODUCT

(71) Applicant: FUJITSU LIMITED, Kawasaki-shi, Kanagawa (JP)

(72) Inventors: Kenichi Fujita, Nagoya (JP); Hiroshi Murayama, Fuji (JP); Tsuyoshi Uchida, Kawasaki (JP)

(73) Assignee: FUJITSU LIMITED, Kawasaki (JP)

( * ) Notice: Subject to any disclaimer, the term of this patent is extended or adjusted under 35 U.S.C. 154(b) by 134 days.

(21) Appl. No.: 14/133,795

(22) Filed: Dec. 19, 2013

(65) Prior Publication Data
US 2014/0281337 A1    Sep. 18, 2014

(30) Foreign Application Priority Data

Mar. 18, 2013    (JP) ................................ 2013-055602

(51) Int. Cl.
*G06F 12/02*    (2006.01)
*G06F 3/06*    (2006.01)

(52) U.S. Cl.
CPC .......... *G06F 12/023* (2013.01); *G06F 3/0607* (2013.01); *G06F 3/0631* (2013.01); *G06F 3/0665* (2013.01); *G06F 3/0689* (2013.01)

(58) Field of Classification Search
CPC ............. G06F 17/30575; G06F 3/0644; G06F 3/0647; G06F 12/023; G06F 9/5083; G06F 2206/1012; G06F 3/067; H04L 67/1029

See application file for complete search history.

(56) References Cited

U.S. PATENT DOCUMENTS 6,405,284 B1 *    6/2002    Bridge ........................ 711/114
6,526,478 B1 *    2/2003    Kirby ........................... 711/114
(Continued)

FOREIGN PATENT DOCUMENTS

JP    9-223047 A    8/1997
JP    2005-141528 A    6/2005
(Continued)

OTHER PUBLICATIONS

Dufrasne, B. et al., IBM, "IBM XIV Storage System: Architecture, Implementation, and Usage," International Technical Support Organization, Redbooks, Third Edition, Jan. 2011, pp. 1-318, ibm.com/redbooks, ISBN 0738435082.
(Continued)

Primary Examiner — Midys Rojas
Assistant Examiner — Khoa D Doan
(74) Attorney, Agent, or Firm — Fujitsu Patent Center

(57) ABSTRACT

A storage system includes a storage apparatus having a first storage unit having first storage and a first storage control unit controlling access to the first storage, and a first control unit controlling storage units including the first storage unit; a second storage unit having second storage and a second storage control unit controlling access to the second storage; and a second control unit controlling storage units including the second storage unit. The second storage unit and second control unit are added to the storage apparatus. the first control unit includes a memory unit storing allocation information including an allocation state of storage areas of the first and second storage, and a processor configured to execute rearrangement control of an allocated storage area based on the allocation information corresponding to unevenness between a storage capacity of an allocated storage area in the first storage and that in the second storage.

11 Claims, 32 Drawing Sheets

(56) References Cited

U.S. PATENT DOCUMENTS

| | | | |
|---|---|---|---|
| 7,185,163 B1* | 2/2007 | Knight et al. | 711/165 |
| 7,530,073 B1* | 5/2009 | Shutt et al. | 718/105 |
| 7,711,897 B1* | 5/2010 | Chatterjee | G06F 3/0605 711/112 |
| 7,774,572 B2* | 8/2010 | Yokohata et al. | 711/171 |
| 7,904,681 B1* | 3/2011 | Bappe et al. | 711/162 |
| 7,921,257 B1* | 4/2011 | Kleiman et al. | 711/114 |
| 8,230,193 B2* | 7/2012 | Klemm et al. | 711/165 |
| 8,364,858 B1* | 1/2013 | Martin et al. | 710/15 |
| 8,452,819 B1* | 5/2013 | Sorenson et al. | 707/809 |
| 8,539,197 B1* | 9/2013 | Marshall et al. | 711/173 |
| 8,924,676 B1* | 12/2014 | Anderson | 711/165 |
| 9,003,157 B1* | 4/2015 | Marshak et al. | 711/173 |
| 9,015,411 B2* | 4/2015 | Klemm et al. | 711/114 |
| 2002/0004890 A1* | 1/2002 | Ofek et al. | 711/161 |
| 2002/0174315 A1* | 11/2002 | Yamamoto | 711/170 |
| 2003/0074527 A1* | 4/2003 | Burton et al. | 711/114 |
| 2003/0212872 A1* | 11/2003 | Patterson et al. | 711/165 |
| 2005/0015566 A1* | 1/2005 | Zohar et al. | 711/203 |
| 2005/0102289 A1 | 5/2005 | Sonoda et al. | |
| 2005/0114350 A1* | 5/2005 | Rose | G06F 3/0613 |
| 2005/0216591 A1* | 9/2005 | Sato | 709/226 |
| 2006/0112247 A1* | 5/2006 | Ramany et al. | 711/165 |
| 2007/0016726 A1* | 1/2007 | Zohar et al. | 711/114 |
| 2007/0050588 A1* | 3/2007 | Tabata et al. | 711/165 |
| 2007/0233993 A1* | 10/2007 | Kato et al. | 711/170 |
| 2007/0239954 A1* | 10/2007 | Sakashita et al. | 711/165 |
| 2008/0104350 A1* | 5/2008 | Shimizu et al. | 711/165 |
| 2008/0126525 A1* | 5/2008 | Ueoka et al. | 709/223 |
| 2008/0235448 A1* | 9/2008 | Inoue et al. | 711/114 |
| 2008/0270720 A1* | 10/2008 | Tanabe et al. | 711/162 |
| 2009/0144732 A1* | 6/2009 | Tanaka | 718/1 |
| 2009/0172666 A1* | 7/2009 | Yahalom et al. | 718/1 |
| 2009/0198940 A1* | 8/2009 | Ash et al. | 711/165 |
| 2010/0011185 A1* | 1/2010 | Inoue et al. | 711/172 |
| 2010/0082900 A1 | 4/2010 | Murayama et al. | |
| 2011/0060885 A1* | 3/2011 | Satoyama et al. | 711/170 |
| 2011/0072208 A1* | 3/2011 | Gulati et al. | 711/114 |
| 2011/0185135 A1* | 7/2011 | Fujii et al. | 711/162 |
| 2011/0185139 A1* | 7/2011 | Inoue et al. | 711/165 |
| 2011/0208940 A1* | 8/2011 | Naganuma et al. | 711/170 |
| 2011/0289273 A1* | 11/2011 | Ikeuchi et al. | 711/114 |
| 2011/0320754 A1* | 12/2011 | Ichikawa et al. | 711/165 |
| 2012/0084522 A1* | 4/2012 | Shiomi et al. | 711/162 |
| 2012/0151138 A1* | 6/2012 | Tokuda et al. | 711/114 |
| 2012/0198151 A1* | 8/2012 | Kato et al. | 711/114 |
| 2012/0226885 A1* | 9/2012 | Mori et al. | 711/170 |
| 2012/0254561 A1* | 10/2012 | Takeda | 711/154 |
| 2013/0097377 A1* | 4/2013 | Satoyama et al. | 711/114 |
| 2013/0111221 A1* | 5/2013 | Fujii et al. | 713/193 |
| 2013/0212349 A1* | 8/2013 | Maruyama | 711/167 |
| 2014/0013085 A1* | 1/2014 | Vats et al. | 712/217 |
| 2014/0019701 A1* | 1/2014 | Ohira et al. | 711/165 |
| 2014/0082279 A1* | 3/2014 | Kimmel et al. | 711/114 |
| 2014/0244958 A1* | 8/2014 | Kameoka et al. | 711/165 |
| 2014/0351538 A1* | 11/2014 | Kono et al. | 711/162 |

FOREIGN PATENT DOCUMENTS

| | | |
|---|---|---|
| JP | 2007-513429 | 5/2007 |
| JP | 2008-112276 | 5/2008 |
| JP | 2008-234158 | 10/2008 |
| WO | 2005-057343 | 6/2005 |

OTHER PUBLICATIONS

Japanese Office Action mailed Sep. 13, 2016 for corresponding Japanese Patent Application 2013-055602, with Partial English Translation, 6 pages.

Extended European Search Report dated Nov. 7, 2016 for corresponding European Patent Application No. 13198935.2, 6 pages.

* cited by examiner

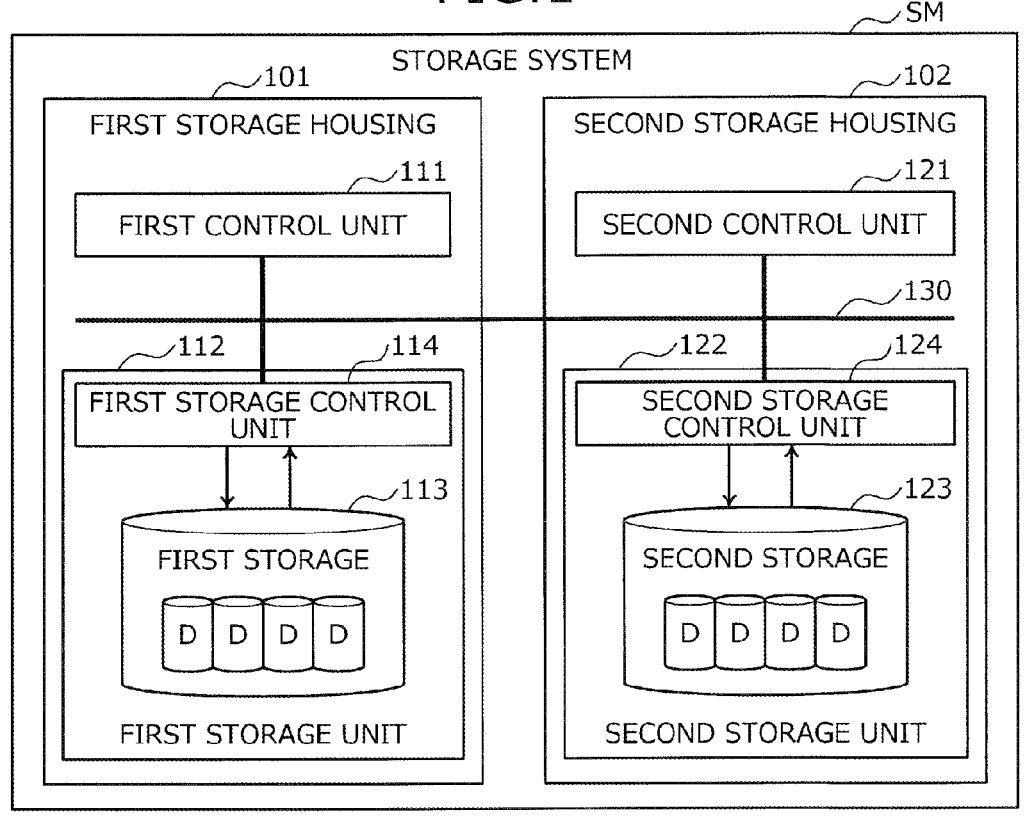
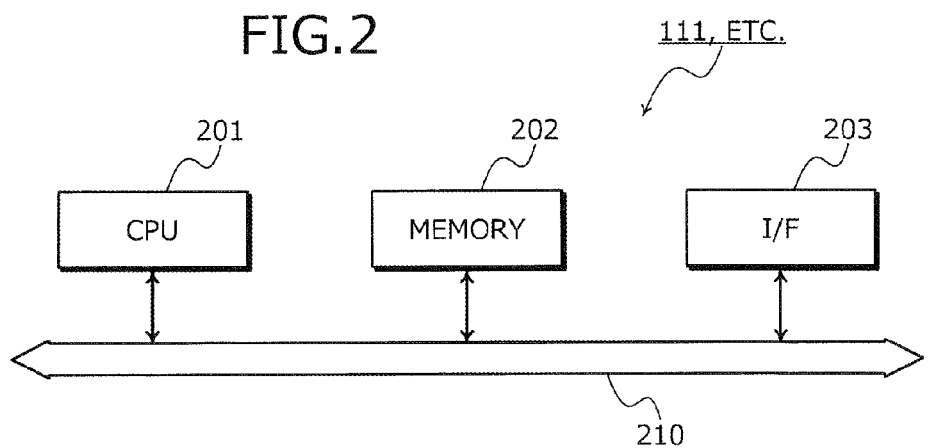

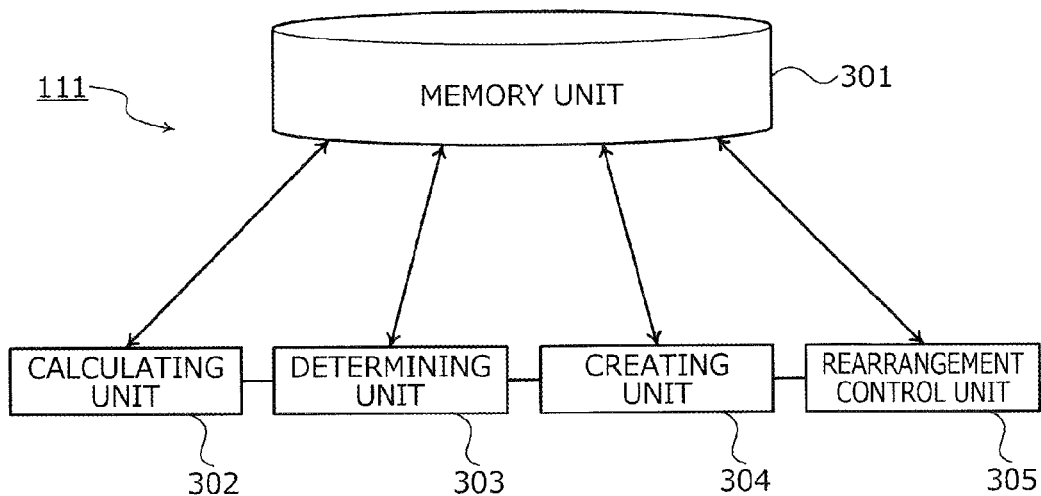
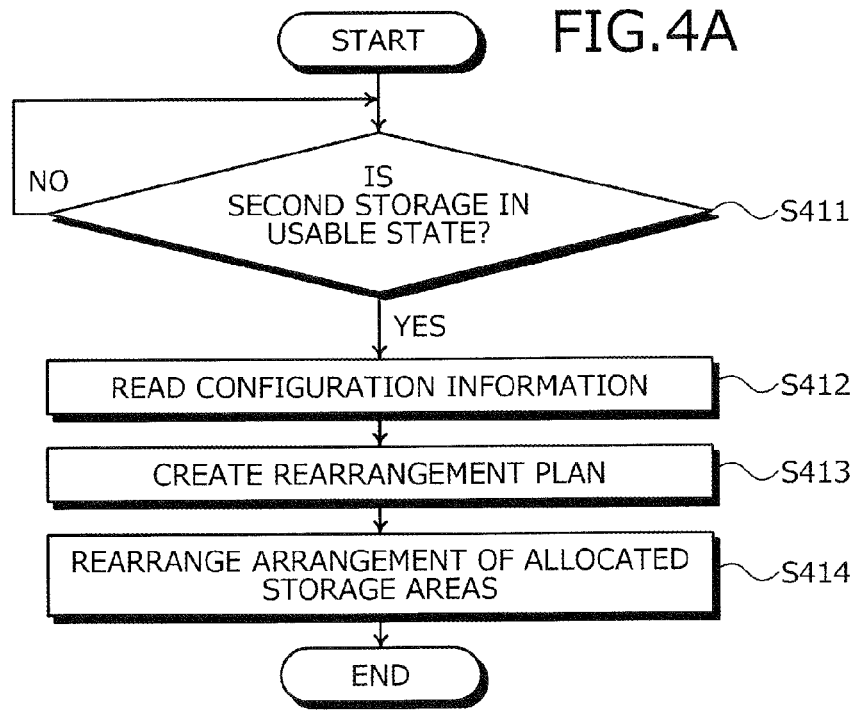

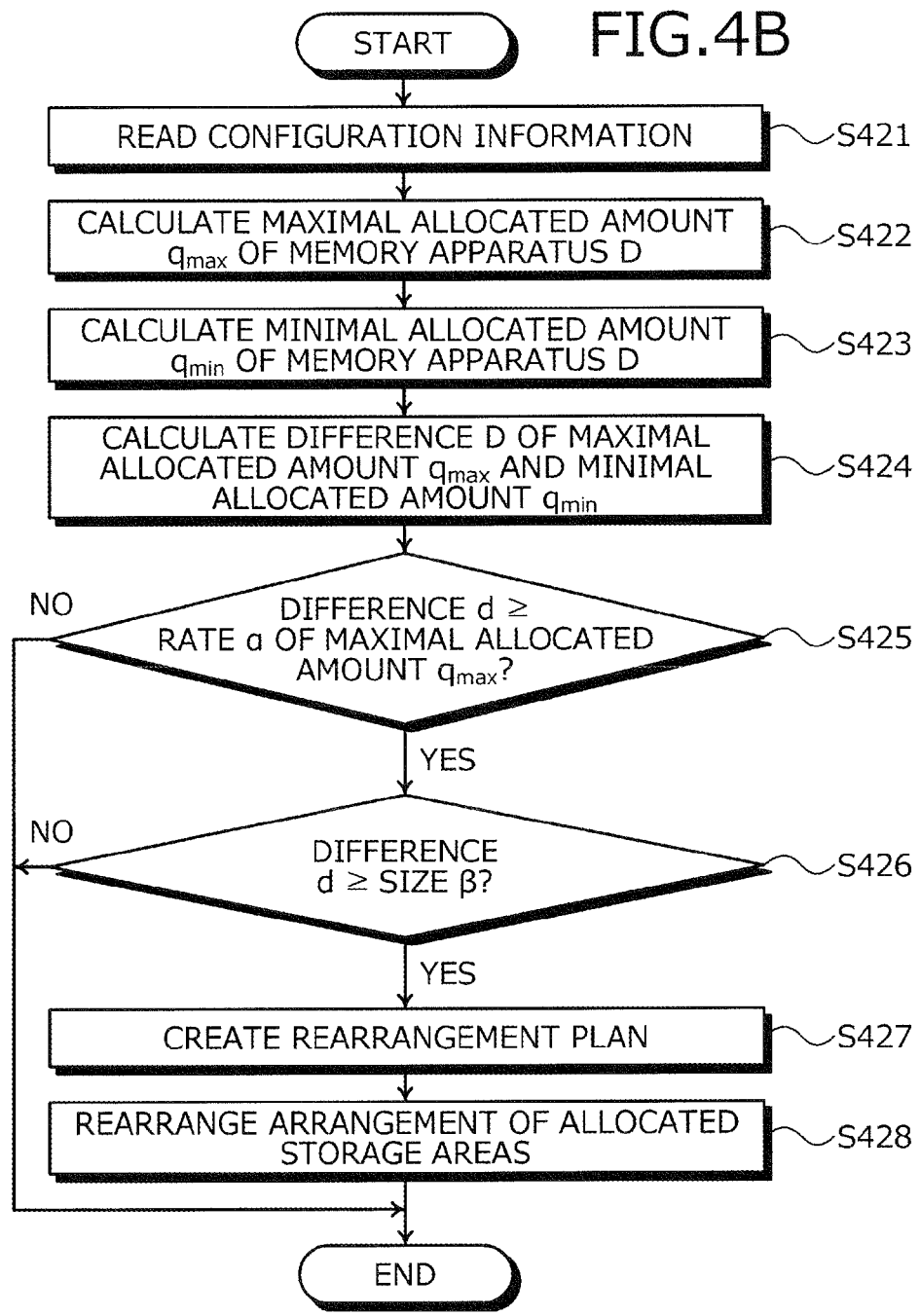

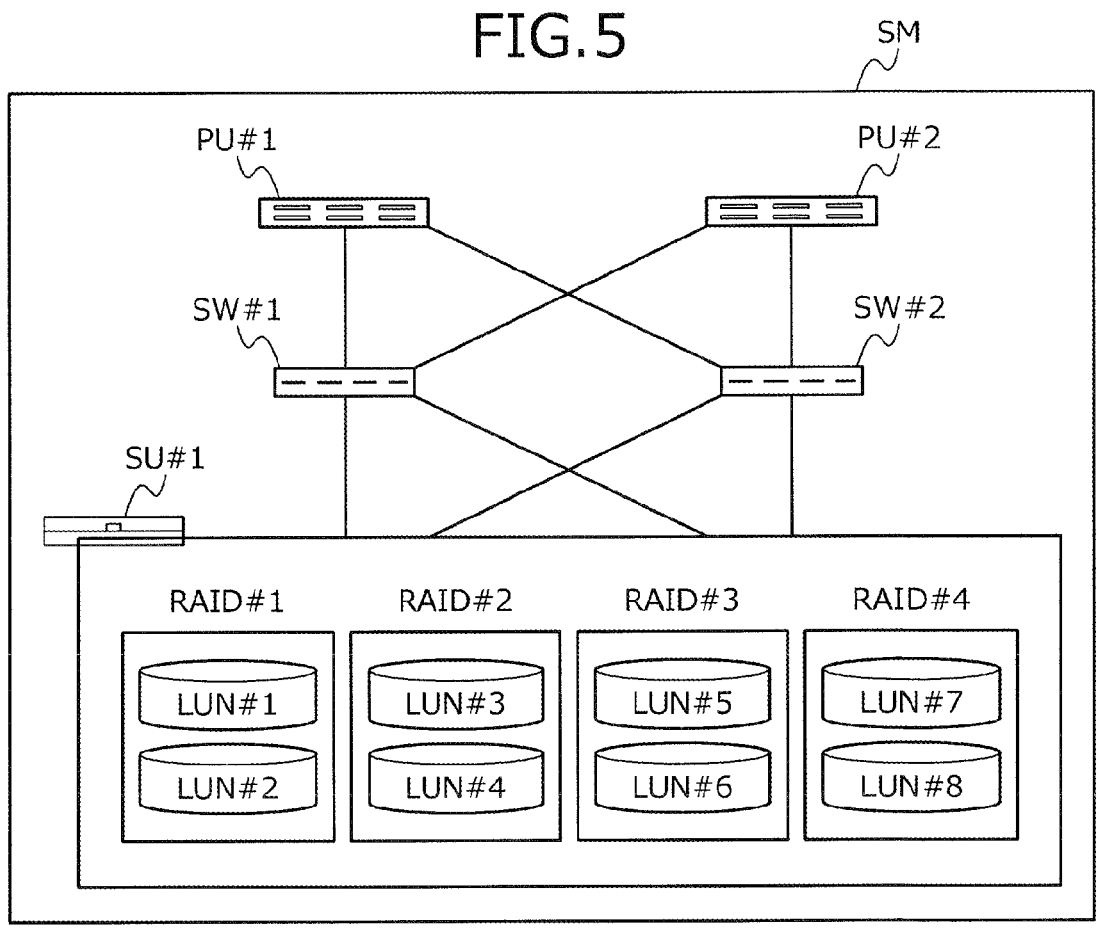

FIG.8

VOLUME INDEX TABLE 800

| VOLUME NUMBER | VOLUME NAME | OPERATING PU NUMBER | VOLUME ATTRIBUTE | VOLUME SIZE | VOLUME STATE | REARRANGE-MENT STATE |
|---|---|---|---|---|---|---|
| 1 | Vdisk1 | 1 | THIN-PROVISIONING VOLUME | 500 | NORMAL | UNDER REAR-RANGEMENT |
| 2 | Vdisk2 | 2 | THIN-PROVISIONING VOLUME | 700 | NORMAL | UNDER REAR-RANGEMENT |
| 3 | Bk-volume | 1 | STANDARD VOLUME | 530 | NORMAL | AWAITING RE-ARRANGEMENT |
| 4 | Dev001 | 2 | THIN-PROVISIONING VOLUME | 1024 | NORMAL | AWAITING RE-ARRANGEMENT |
| 5 | Mirror002 | 1 | MIRROR VOLUME | 580 | NORMAL | AWAITING RE-ARRANGEMENT |
| : | : | : | : | : | : | : |
| 127 | #mir-001 | 5 | MIRROR VOLUME | 750 | NORMAL | AWAITING RE-ARRANGEMENT |
| 128 | #mir-002 | 5 | MIRROR VOLUME | 750 | ABNORMAL | AWAITING RE-ARRANGEMENT |
| : | : | : | : | : | : | : |
| n | NULL(0) | -1 | NOT DETERMINED | 0 | NOT DE-TERMINED | REARRANGEMENT NOT EXECUTED |

MIRROR VOLUME INDEX TABLE — 900

| VOLUME NUMBER | NUMBER OF MIRRORS | MIRROR VOLUME NUMBER 1 | MIRROR VOLUME NUMBER 2 |
|---|---|---|---|
| 5 | 2 | 127 | 128 |
| 19 | 2 | 221 | 223 |
| : | : | : | : |
| n | -1 | -1 | -1 |

900-1 → (row 1)
900-2 → (row 2)

| | VOLUME NUMBER | SEGMENT SET NUMBER | SEGMENT NUMBER | STORAGE APPARATUS | LUN NUMBER | SEGMENT STATE | REARRANGE-MENT STATE |
|---|---|---|---|---|---|---|---|
| 1000-1 | 1 | 1 | 1 | 1 | 1 | VALID | |
| 1000-2 | 1 | 1 | 2 | 1 | 2 | VALID | |
| | ‥ | ‥ | ‥ | ‥ | ‥ | ‥ | ‥ |
| | 1 | 1 | 8 | 1 | 8 | VALID | |
| | 1 | 2 | 1 | 2 | 1 | VALID | |
| | 1 | 2 | 2 | 2 | 2 | VALID | |
| | ‥ | ‥ | ‥ | ‥ | ‥ | ‥ | ‥ |
| | 1 | 2 | 8 | 2 | 8 | VALID | |
| | 1 | 3 | 1 | 1 | 1 | VALID | |
| | 1 | 3 | 1 | 1 | 2 | VALID | |
| | ‥ | ‥ | ‥ | ‥ | ‥ | ‥ | ‥ |

VOLUME SEGMENT TABLE 1000

FIG.11

REARRANGEMENT PLAN TABLE ~720

| VOLUME NUMBER | SEGMENT SET NUMBER | SEGMENT NUMBER | CURRENT STORAGE APPARATUS | CURRENT LUN NUMBER | REARRANGE- MENT STORAGE APPARATUS | REARRANGE- MENT LUN NUMBER | REARRANGE- MENT STATE |
|---|---|---|---|---|---|---|---|
| 1 | 1 | 1 | 1 | 1 | 1 | 1 | REARRANGEMENT UNNECESSARY |
| 1 | 1 | 2 | 1 | 2 | 1 | 2 | REARRANGEMENT UNNECESSARY |
| 1 | 1 | 3 | 1 | 3 | 1 | 3 | REARRANGEMENT UNNECESSARY |
| 1 | 1 | 4 | 1 | 4 | 1 | 4 | REARRANGEMENT UNNECESSARY |
| 1 | 1 | 5 | 1 | 5 | 1 | 5 | REARRANGEMENT UNNECESSARY |
| .. | .. | .. | .. | .. | .. | .. | .. |
| 1 | 1 | 8 | 1 | 8 | 1 | 8 | REARRANGEMENT UNNECESSARY |
| 1 | 2 | 1 | 1 | 1 | 2 | 1 | REARRANGEMENT UNNECESSARY |
| 1 | 2 | 2 | 1 | 2 | 2 | 2 | REARRANGEMENT UNNECESSARY |
| .. | .. | .. | .. | .. | .. | .. | .. |
| 1 | 2 | 8 | 1 | 8 | 2 | 8 | REARRANGEMENT UNNECESSARY |
| .. | .. | .. | .. | .. | .. | .. | .. |

1100-1
1100-2
-----
1100-5

"REARRANGEMENT UNNECESSARY", "AWAITING REARRANGEMENT", "REARRANGEMENT COMPLETED"

FIG.12

| ITEM | CONDITION | BEFORE REARRANGEMENT | AFTER REARRANGEMENT | COMPLEMENT |
|---|---|---|---|---|
| 1 | BASIC SET 8.4 TB IS ADDED TO 8.4 TB | SU#1 8.4 TB | SU#1 4.2 TB, SU#2 4.2 TB | TO DISTRIBUTE AND ARRANGE TO EQUALIZE PHYSICAL USE AMOUNTS |
| 2 | BASIC SET 8.4 TB IS ADDED TO 16.8 TB | SU#1 8.4 TB | SU#1 4.2 TB, SU#2 4.2 TB | TO DISTRIBUTE AND ARRANGE TO EQUALIZE PHYSICAL USE AMOUNTS |
| 3 | BASIC SET+EXPANSION ONE UNIT 16.8 TB IS ADDED TO (TOTAL OF 16.8 TB) | SU#1 8.4 TB, SU#2 8.4 TB | SU#1 5.6 TB, SU#2 5.6 TB, SU#3 5.6 TB | TO DISTRIBUTE AND ARRANGE TO EQUALIZE PHYSICAL USE AMOUNTS |

FIG.13

BEFORE REARRANGEMENT

SU#1

| A0 | A1 | A2 | A3 | A4 | A5 | A6 | A7 |
|----|----|----|----|----|----|----|----|
| A8 | A9 | A10 | A11 | A12 | A13 | A14 | A15 |
| A16 | A17 | A18 | A19 | A20 | A21 | A22 | A23 |
| A24 | A25 | A26 | A27 | A28 | A29 | A30 | A31 |
| B0 | B1 | B2 | B3 | B4 | B5 | B6 | B7 |
| B8 | B9 | B10 | B11 | B12 | B13 | B14 | B15 |

SU#2

(empty)

REARRANGEMENT PROPOSAL

SU#1

| A0 | A1 | A2 | A3 | A4 | A5 | A6 | A7 |
|----|----|----|----|----|----|----|----|
| A16 | A17 | A18 | A19 | A20 | A21 | A22 | A23 |
| B0 | B1 | B2 | B3 | B4 | B5 | B6 | B7 |

SU#2

| A8 | A9 | A10 | A11 | A12 | A13 | A14 | A15 |
|----|----|----|----|----|----|----|----|
| A24 | A25 | A26 | A27 | A28 | A29 | A30 | A31 |
| B8 | B9 | B10 | B11 | B12 | B13 | B14 | B15 |

UNDER REARRANGEMENT

SU#1

| A0 | A1 | A2 | A3 | A4 | A5 | A6 | A7 |
|----|----|----|----|----|----|----|----|
|    |    |    |    |    |    |    |    |
| A16 | A17 | A18 | A19 | A20 | A21 | A22 | A23 |
|    |    |    |    |    |    |    |    |
| B0 | B1 | B2 | B3 | B4 | B5 | B6 | B7 |
| B8 | B9 | B10 | B11 | B12 | B13 | B14 | B15 |

SU#2

| A8 | A9 | A10 | A11 | A12 | A13 | A14 | A15 |
|----|----|----|----|----|----|----|----|
| A24 | A25 | A26 | A27 | A28 | A29 | A30 | A31 |

AFTER REARRANGEMENT

SU#1

| A0 | A1 | A2 | A3 | A4 | A5 | A6 | A7 |
|----|----|----|----|----|----|----|----|
| A16 | A17 | A18 | A19 | A20 | A21 | A22 | A23 |
| B0 | B1 | B2 | B3 | B4 | B5 | B6 | B7 |

SU#2

| A8 | A9 | A10 | A11 | A12 | A13 | A14 | A15 |
|----|----|----|----|----|----|----|----|
| A24 | A25 | A26 | A27 | A28 | A29 | A30 | A31 |
| B8 | B9 | B10 | B11 | B12 | B13 | B14 | B15 |

FIG.15

| VOLUME NUMBER | VOLUME NAME | OPERATING PU NUMBER | VOLUME ATTRIBUTE | VOLUME SIZE | VOLUME STATE | REARRANGE-MENT STATE |
|---|---|---|---|---|---|---|
| 1 | Vdisk1 | 1 | THIN-PROVISIONING VOLUME | 500 | NORMAL | UNDER REARRANGEMENT |
| -1 | NULL(0) | -1 | NOT DETERMINED | 0 | NOT DE-TERMINED | REARRANGEMENT NOT EXECUTED |
| -1 | NULL(0) | -1 | NOT DETERMINED | 0 | NOT DE-TERMINED | REARRANGEMENT NOT EXECUTED |
| -1 | NULL(0) | -1 | NOT DETERMINED | 0 | NOT DE-TERMINED | REARRANGEMENT NOT EXECUTED |
| .. | .. | .. | .. | .. | .. | .. |
| -1 | NULL(0) | -1 | NOT DETERMINED | 0 | NOT DE-TERMINED | REARRANGEMENT NOT EXECUTED |

| VOLUME NUMBER | SEGMENT SET NUMBER | SEGMENT NUMBER | STORAGE APPARATUS | LUN NUMBER | SEGMENT STATE | REARRANGE-MENT STATE |
|---|---|---|---|---|---|---|
| 1 | 1 | 1 | 1 | 1 | VALID | |
| 1 | 1 | 2 | 1 | 2 | VALID | |
| : | : | : | : | : | : | : |
| 1 | 1 | 8 | 1 | 8 | VALID | |
| 1 | 2 | 1 | 2 | 1 | VALID | |
| 1 | 2 | 2 | 2 | 2 | VALID | |
| : | : | : | : | : | : | : |
| 1 | 2 | 8 | 2 | 8 | VALID | |
| 1 | 3 | 1 | 1 | 3 | VALID | |
| 1 | 3 | 1 | 1 | 3 | VALID | |
| 1 | 3 | 1 | 1 | 6 | VALID | |
| : | : | : | : | : | : | : |

~1000

(16-2)

| VOLUME NUMBER | SEGMENT SET NUMBER | SEGMENT NUMBER | STORAGE APPARATUS | LUN NUMBER | SEGMENT STATE | REARRANGE-MENT STATE |
|---|---|---|---|---|---|---|
| 1 | 1 | 1 | 1 | 1 | VALID | |
| 1 | 1 | 2 | 1 | 2 | VALID | |
| : | : | : | : | : | : | : |
| 1 | 1 | 8 | 1 | 8 | VALID | |
| 1 | 2 | 1 | 2 | 1 | VALID | |
| 1 | 2 | 2 | 2 | 2 | VALID | |
| : | : | : | : | : | : | : |
| 1 | 2 | 8 | 2 | 8 | VALID | |
| 1 | 3 | 1 | 1 | 3 | VALID | DURING ARRANGE-MENT PROCESS |
| 1 | 3 | 1 | 1 | 3 | VALID | DURING ARRANGE-MENT PROCESS |
| 1 | 3 | 1 | 1 | 6 | VALID | DURING ARRANGE-MENT PROCESS |
| : | : | : | : | : | : | : |

TRANSFER SOURCE/DESTINATION VOLUME CORRESPONDENCE TABLE 3100

| TRANSFER SOURCE TARGET ID | TRANSFER DESTINATION LUN NUMBER | TRANSFER SOURCE SIZE (Bytes) | TRANSFER DESTINATION TARGET ID | TRANSFER DESTINATION LUN NUMBER | VOLUME NUMBER |
|---|---|---|---|---|---|
| iqnTo1 | 1 | 10737418240 | iqnTp1 | 1 | 1 |
| iqnTo2 | 2 | 10737418240 | iqnTp2 | 1 | 2 |
| iqnTo3 | 3 |  | iqnTp3 | 1 | 3 |
| iqnTo4 | 4 |  | iqnTp4 | 1 | 4 |
| .. | .. | .. | .. | .. | .. |
| iqnTon | n | 31457280 | iqnTpn | 1 | .. |

3100-1
3100-2
3100-n

STORAGE SYSTEM, STORAGE APPARATUS, AND COMPUTER PRODUCT

CROSS REFERENCE TO RELATED APPLICATIONS

This application is based upon and claims the benefit of priority of the prior Japanese Patent Application No. 2013-055602, filed on Mar. 18, 2013, the entire contents of which are incorporated herein by reference.

FIELD

The embodiment discussed herein is related to a storage system, a storage apparatus, and a computer product.

BACKGROUND

Storage for a virtualized environment, i.e., a so-called virtualized storage apparatus has conventionally been present as a storage system capable of realizing a memory apparatus having a free volume configuration and a free storage capacity without being bound by the volume configuration and the storage capacity of a physical memory apparatus. The virtualized storage apparatus internally includes a real storage apparatus that controls access to the physical memory apparatus. The virtualized storage apparatus creates a virtual volume by a processor that manages the real storage apparatus.

The virtualized storage apparatus performs data access by, for example, wide-striping. "Wide-striping" is a technique of distributing data access of one volume, to plural logical unit numbers (LUNs) and performing access according to units respectively referred to as "strip" and having a fixed length.

The storage area of the overall virtualized storage apparatus may be expanded with increases in the storage capacity demanded of the virtualized storage apparatus. A method of expanding the storage area of the overall virtualized storage apparatus may be, for example, addition of a real storage apparatus or an increase of the number of memory apparatuses loaded on the real storage apparatus.

For example, according to a related technique, plural disks configure groups; a storage area is allocated from each of the plural groups to a virtualized volume; and the storage area of each of the groups used by the virtualized volume is rearranged based on external operation. A virtualized file system is present that includes plural storage processor nodes including a managing node; a backbone switch; a disk drive array; and a virtualized file manager executed at the managing node. According to another technique, when virtualized volumes are rearranged among plural pools, time periods for the pools to be depleted before and after the rearrangement are estimated based on information in a database, and execution or cancellation of the rearrangement is determined, or a preferable rearrangement plan is determined, based on the result of the estimation. For examples, refer to Japanese Laid-Open Patent Publication Nos. 2008-234158 and 2008-112276, and Published Japanese-Translation of PCT Application, Publication No. 2007-513429).

Nonetheless, according to the conventional techniques, when the storage area of the overall system is expanded, the access performance with respect to the data stored before the change of the system configuration remains the same as that corresponding to the performance of the storage apparatus before the change of the system configuration.

SUMMARY

According to an aspect of an embodiment, a storage system includes a storage apparatus that includes a first storage unit that has a first storage and a first storage control unit that controls access to the first storage, and a first control unit that controls accessible storage units including the first storage unit; a second storage unit that has a second storage and a second storage control unit that controls access to the second storage; and a second control unit that controls accessible storage units including the second storage unit. The second storage unit and the second control unit that are added to the storage apparatus. The first control unit includes a memory unit that stores allocation information including an allocation state of a storage area of the first storage and an allocation state of a storage area of the second storage, and a first processor that is configured to execute rearrangement control of a currently allocated storage area based on the allocation information corresponding to a degree of unevenness occurring between a storage capacity of a currently allocated storage area in the first storage and a storage capacity of a currently allocated storage area in the second storage.

The object and advantages of the invention will be realized and attained by means of the elements and combinations particularly pointed out in the claims.

It is to be understood that both the foregoing general description and the following detailed description are exemplary and explanatory and are not restrictive of the invention.

BRIEF DESCRIPTION OF DRAWINGS

FIG. 1 is an explanatory diagram of an example of a storage system SM according to an embodiment;

FIG. 2 is a block diagram of an example of a hardware configuration of a first control unit 111, etc.;

FIG. 3 is a block diagram of an example of a functional configuration of the first control unit 111;

FIG. 4A is a flowchart of an example of a procedure for a first rearrangement control process executed by the first control unit 111;

FIG. 4B is a flowchart of an example of a procedure for a second rearrangement control process executed by the first control unit 111;

FIG. 5 is an explanatory diagram of an example of system configuration of the storage system SM according to a first example;

FIG. 8 is an explanatory diagram of an example of the contents of a volume index table 800;

FIG. 9 is an explanatory diagram of an example of the contents of a mirror volume index table 900;

FIG. 11 is an explanatory diagram of an example of the contents of a rearrangement plan table 720;

FIG. 12 is an explanatory diagram of an example of a rearrangement plan for a volume;

FIG. 13 is an explanatory diagram (Part I) of an example of rearrangement of volumes;

FIG. 15 is an explanatory diagram of an example of updating of the volume index table 800;

FIG. 16 is an explanatory diagram of an example of updating of the volume segment table 1000;

FIG. 17 is an explanatory diagram of an example of updating of the rearrangement plan table 720;

FIG. 31 is an explanatory diagram of an example of the contents of a transfer source/destination volume correspondence table 3100.

DESCRIPTION OF EMBODIMENTS

Figure 6:
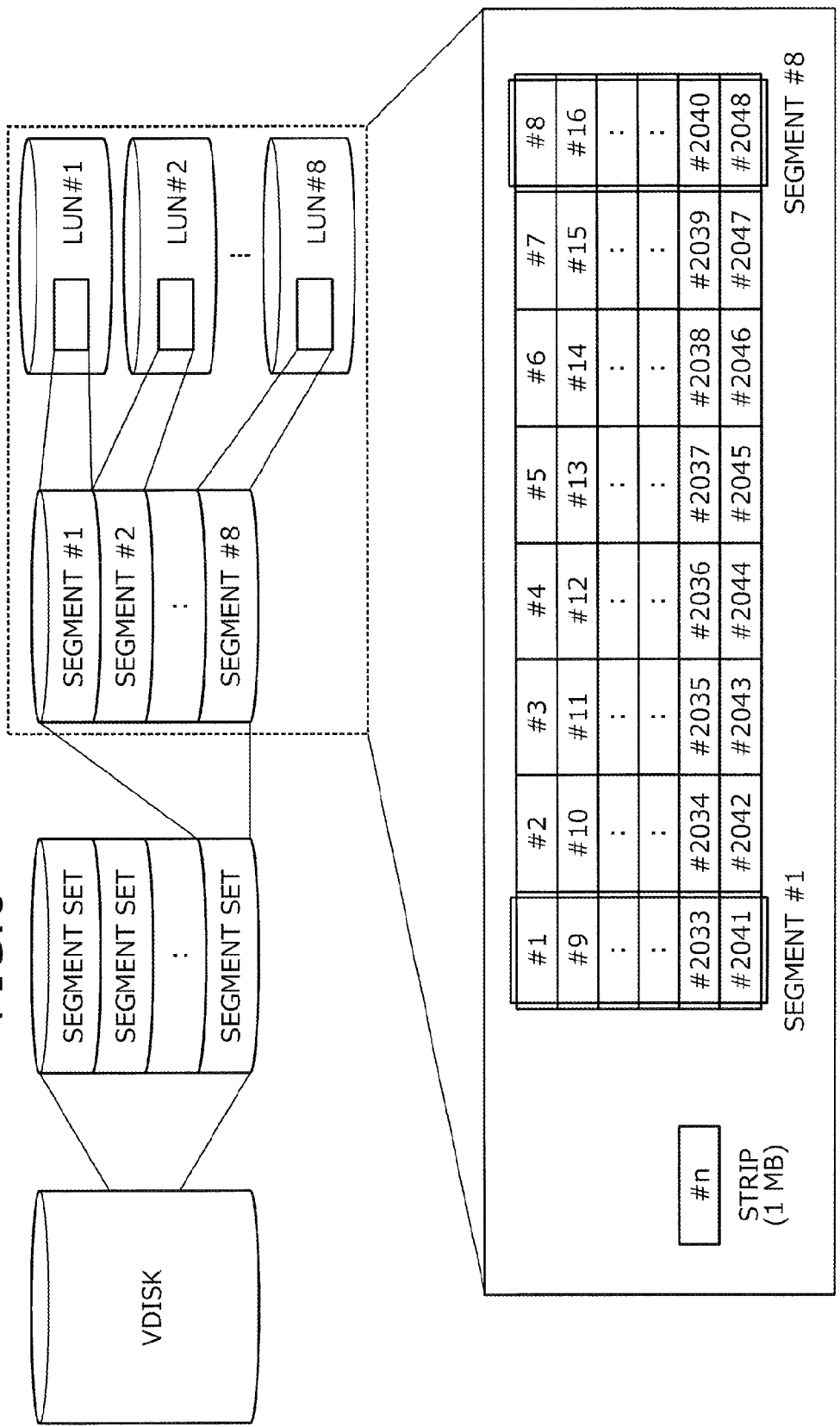
FIG. 6 is an explanatory diagram of an example of configuration of a VDISK.

Embodiments of a storage system, a storage apparatus, and a control program will be described in detail with reference to the accompanying drawings.

FIG. 1 is an explanatory diagram of an example of a storage system SM according to an embodiment. In FIG. 1, the storage system SM includes first and second storage housings 101 and 102. The first storage housing 101 includes a first control unit 111 and a first storage unit 112. The first storage unit 112 includes first storage 113 and a first storage control unit 114. The first storage control unit 114 is a computer that controls access to the first storage 113. The first storage housing 101 operates independently as a storage apparatus.

The first control unit 111 is a computer that controls the first storage unit 112 subordinate thereto, and has a function of causing a second storage 123 to be available, expanding the storage capacity of the overall storage system SM when the second storage housing 102 is connected to the first storage housing 101.

The first control unit 111 manages a second storage unit 122 as a subordinate storage unit when the second storage unit 122 is connected to the first control unit 111 and becomes accessible; accepts access to the first and the second storage 113 and 123; and manages other control units and controls the overall system as a master control unit after another control unit (for example, a second control unit 121) is added.

The second storage housing 102 includes the second control unit 121 and the second storage unit 122. The second storage unit 122 includes the second storage 123 and a second storage control unit 124. The second storage control unit 124 is a computer that controls access to the second storage 123. The second control unit 121 and the second storage unit 122 are "components" used when system expansion is performed and, for example, are incorporated in the storage system SM to function as storage apparatuses.

The second control unit 121 is a computer that controls the storage unit subordinate thereto; manages the first and the second storage 113 and 123 as subordinate storage units when the second storage housing 102 is connected to the first storage housing 101; and accepts access to the first and the second storage 113 and 123.

The first and the second storage 113 and 123 each include one or more memory apparatus(es) D. The memory apparatus D may be a physical memory apparatus such as, for example, a hard disk, an optical disk, a flash memory, and magnetic tape, or may be a logical memory apparatus, such as a LUN.

The first and the second control units 111 and 121 are respectively connected to the first and the second storage units 112 and 122 by a communication path 130 for connecting the storage housings. Thus, the first control unit 111 can directly access the second storage unit 122, and the second control unit 121 can directly access the first storage unit 112.

The storage system SM accesses data by, for example, wide-striping. Based on the wide-striping, degradation of the performance consequent to concentration of access can be suppressed and stable performance can be secured without executing complicated performance design taking into consideration the amount of access by the server, etc., and the physical position of the volume.

The storage area of the overall storage system SM may be expanded with increases of the storage capacity demanded of the storage system SM. It is assumed that the second storage unit 122 is added to the existing first storage 101 and the expansion of the storage area of the overall storage system SM (i.e., "scale out") is executed.

In this case, data stored after the system configuration has been changed may be stored in the plural storage units (in the example of FIG. 1, the first and the second storage units 112 and 122) based on the wide-striping and therefore, access performance corresponding to the plural storage units can be expected.

On the other hand, the access performance for the data stored before the change of the system configuration stays as the performance of the storage unit (in the example of FIG. 1, the first storage unit 112) before the change of the system configuration. As above, unbalanced access performance for data stored before and after the change of the system configuration is not desirable for managing the performance of the storage system SM.

In this embodiment, the first control unit 111 of the first storage housing 101 executes rearrangement control for the currently allocated storage areas, according to the degree of unevenness of the storage capacity of the currently allocated storage areas, occurring between the first and the second storage 113 and 123.

For example, when a storage capacity expansion process is executed by connecting the second control unit 121 and the second storage unit 122 to the first storage housing 101 and predefined unevenness is detected, the first control unit 111 executes the rearrangement control for the currently allocated storage areas. Thereby, when the system configuration is changed by adding the second control unit 121 and the second storage unit 122 to the storage system SM, optimization can be facilitated of the access performance for the data stored before and after the change.

An example of a hardware configuration of the computer of the first and the second control units 111 and 121, and the first and the second storage control units 114 and 124 (herein, simply "the first control unit 111, etc.") will be described.

FIG. 2 is a block diagram of an example of a hardware configuration of the first control unit 111, etc. As depicted in FIG. 2, the first control unit 111, etc. includes a central processing unit (CPU) 201, memory 202, and an interface (I/F) 203. The components are respectively connected by a bus 210.

The CPU 201 governs overall control of the first control unit 111, etc. The memory 202 includes, for example, read only memory (ROM), random access memory (RAM), and flash ROM. For example, the flash ROM stores programs such as an OS and firmware; the ROM stores application programs; and the RAM is used as a work area of the CPU 201. Programs stored in the memory 201 are loaded onto the CPU 201, whereby encoded processes are executed by the CPU 201.

The I/F 203 controls the input and output of data from other computers. For example, the I/F 203 is connected to a network such as a local area network (LAN), a wide area network (WAN), and the Internet, via a communication line and is connected to other apparatuses through the network. The I/F 203 administers an internal interface with the network and controls the input and output of data from other computers.

FIG. 3 is a block diagram of an example of a functional configuration of the first control unit 111. As depicted in FIG. 3, the first control unit 111 includes a memory unit 301, a calculating unit 302, a determining unit 303, a creating unit 304, and a rearrangement control unit 305. Functions of the units from the calculating unit 302 to the rearrangement control unit 305 are implemented, for example, by causing the CPU 201 to execute programs stored in the memory 202 depicted in FIG. 2, or by using the I/F 203. The results of the processing by the functional units are stored in, for example, the memory 202.

The memory unit 301 stores configuration information that indicates the configurations of the storage areas of the first and the second storage 113 and 123. The configuration information includes allocation information that includes the allocation states of the storage areas of the first and the second storage 113 and 123. The "allocation information" is information indicating, for example, to which memory apparatus D, the volume is allocated in the first and the second storage 113 and 123.

The "volume" is a storage area; the storage system SM is managed in units of volumes. For example, the volume may be a logical volume formed by grouping plural physical memory apparatuses or partitions in a memory apparatus (e.g., a hard disk) to virtually be one volume.

Although detailed description will be made with reference to FIG. 6, for example, the volume is an aggregate of plural segment sets and each "segment set" is an aggregate of plural segments. In this case, the configuration information is information that indicates to which memory apparatus D of the first and the second storage 113 and 123, each of the segments constituting the volume is allocated.

The configuration information is stored in, for example, the memory 202 of the first storage control unit 114 or the first storage 113. The first control unit 111 reads the configuration information from the memory 202 of the first storage control unit 114 and stores the configuration information into the memory unit 301. The configuration information is updated, for example, according to the allocation state of the storage areas of the first and the second storage 113 and 123.

The configuration information may also be stored in the memory 202 of the second storage control unit 124 or the second storage 123 for redundancy. A specific example of the configuration information will be described later with reference to FIGS. 8 to 10. The memory unit 301 is implemented by, for example, the memory 202 of the first control unit 111.

Based on the configuration information stored in the memory unit 301, the calculating unit 302 calculates a difference "d" between the first and the second storage 113 and 123, i.e., in the storage capacity of the currently allocated storage area of the memory apparatuses D included in the first storage 113 and the storage capacity of the currently allocated storage area of the memory apparatuses D included in the second storage 123. In the description below, the storage capacity of the currently allocated storage areas may be represented by "allocated amount q".

For example, the calculating unit 302 calculates the maximal allocated amount "$q_{max}$" of the memory apparatus D whose allocated amount q is the greatest among the plural memory apparatuses D included in the first and the second storage 113 and 123; and also calculates the minimal allocated amount "$q_{min}$" of the memory apparatus D whose allocated amount q is the least among the plural memory apparatuses D. The calculating unit 302 may calculate the difference d of the maximal allocated amount "$q_{max}$" and the minimal allocated amount "$q_{min}$".

The allocated amount q of each of the memory apparatuses D can be acquired from, for example, the number of segments of the volume allocated to the memory apparatus D. For example, when the capacity of each of the segments is 256 [MB] and the number of segments allocated to a memory apparatus D is "two", the allocated amount q of this memory apparatus D is 512 [MB]. Management is performed in units of segments. A "segment" is a storage area defined by a predetermined capacity and managed based on the position information such as an address to instruct recording or recreating from the host to the volume (logical block addressing: LBA), etc.

Based on the difference d calculated by the calculating unit 302, the determining unit 303 determines whether predefined unevenness is present in the allocation state of the storage areas of the first and the second storage 113 and 123. A state where "predefined unevenness is present" refers to a state where the allocation state of the storage areas is uneven to the extent that rearrangement of the currently allocated storage areas (for example, the segments) in the first and the second storage 113 and 123 is desirable.

For example, when the difference d between the maximal allocated amount "$q_{max}$" and the minimal allocated amount "$q_{min}$" is greater than or equal to a predetermined rate α of the maximal allocated amount "$q_{max}$", the determining unit 303 may determine that the predefined unevenness is present in the allocation state of the storage areas of the first and the second storage 113 and 123. When the calculated difference d between the maximal allocated amount "$q_{max}$" and the minimal allocated amount "$q_{min}$" is greater than or equal to a predetermined size β, the determining unit 303 may determine that the predefined unevenness is present in the allocation state of the storage areas of the first and the second storage 113 and 123.

When the difference d between the maximal allocated amount "$q_{max}$" and the minimal allocated amount "$q_{min}$" is greater than or equal to the predetermined rate α of the maximal allocated amount "$q_{max}$" and is greater than or equal to the predetermined size β, the determining unit 303 may determine that the predefined unevenness is present in the allocation state of the storage areas of the first and the second storage 113 and 123.

When a storage unit is added whose storage capacity is greater than that of the existing storage unit, more segments may be allocated to the added storage unit compared to the existing storage unit. Therefore, as described, the determining unit 303 determines whether the predefined unevenness is present in the allocation state of the storage areas of the first and the second storage 113 and 123, by using a comparison of the allocated amounts, i.e., the absolute amounts used, rather than a usage ratio of the amount used to the available storage capacity.

Immediately after the second storage unit 122 is added, the allocation of the storage areas has not yet been executed for the second storage 123 and the allocated amount of the second storage 123 (the storage capacity of the currently allocated storage area) is zero. Therefore, the determining unit 303 detects the difference d of the allocated amounts q and thereby, can easily detect the unevenness of the allocated amounts of the storage areas of the first and the second storage 113 and 123.

The determination process executed by the determining unit 303 may be executed, for example, periodically at time intervals set in advance or may be executed at an arbitrary timing according to an operational input by a manager of the storage system SM, etc. The rate α and the size β are stored in, for example, the memory 202. Specific values of the rate α and the size β will be described later.

The creating unit 304 creates a rearrangement plan to equalize the allocated amounts q between the first and the second storage 113 and 123, based on the configuration information stored in the memory unit 301. The "rearrangement plan" represents, for example, the memory apparatuses D and storage into which the segments constituting the volume are rearranged. For example, the creating unit 304 creates the rearrangement plan to equalize the allocated amounts q between the memory apparatuses D included in the first and the second storage 113 and 123.

The creating unit 304 may create based on the configuration information stored in the memory unit 301, a rearrangement plan to reduce copying processes for data transfer executed consequent to the rearrangement in each of the first and the second storage 113 and 123. The created rearrangement plan is stored in, for example, a rearrangement plan table 720 depicted in FIG. 11 and described later.

The rearrangement control unit 305 executes rearrangement control of the currently allocated storage areas based on the configuration information stored in the memory unit 301, according to the degree of unevenness between the allocated amounts q of the storage areas of the first and the second storage 113 and 123. For example, the rearrangement control unit 305 controls the first and the second storage units 112 and 122 and thereby, rearranges the arrangement of the currently allocated storage areas in the first and the second storage 113 and 123, according to the rearrangement plan created by the creating unit 304.

For example, the rearrangement control unit 305 executes the rearrangement control of the currently allocated storage areas when the rearrangement control unit 305 detects that the second control unit 121 and the second storage unit 122 are connected to the first storage housing 101, whereby the storage capacity expansion process is executed. The "expansion process" is, for example, a process of setting the second storage 123 of the second storage unit 122 connected to the first storage housing 101, to be available. In this case, the rearrangement control unit 305 executes, for example, the rearrangement control to rearrange of a portion of the arrangement of the currently allocated storage area in the first storage 113, into an unallocated storage area of the second storage 123.

The rearrangement control unit 305 may execute, for example, the rearrangement control of the currently allocated storage areas when the rearrangement control unit 305 detects that the memory apparatus D has been added to the first or the second storage 113 or 123; or may execute control to rearrange the arrangement of the currently allocated storage areas in the first and the second storage 113 and 123 when the determining unit 303 determines that the predefined unevenness is present.

The rearrangement control unit 305 may execute the rearrangement control of the currently allocated storage areas when the rearrangement control unit 305 detects that, during a process of transferring data from another storage unit to the first storage unit 112, the storage capacity expansion process is executed by connecting the second control unit 121 and the second storage unit 122. In this case, the rearrangement control unit 305 executes, for example, the rearrangement control to rearrange a portion of the arrangement of the currently allocated storage areas in the first storage 113, into an unallocated storage area of the second storage 123.

A procedure for a rearrangement control process executed by the first control unit 111 will be described. A procedure for a first rearrangement control process executed by the first control unit 111 will be described with reference to FIG. 4A. The first rearrangement control process is an example of the rearrangement control process executed when scale out is executed for the storage system SM.

FIG. 4A is a flowchart of an example of the procedure for the first rearrangement control process executed by the first control unit 111. In the flowchart of FIG. 4A, the first control unit 111 determines whether the second storage housing 102 (the second control unit 121 and the second storage unit 122) is connected to the first storage housing 101 and the second storage 123 is set to be available (step S411).

The first control unit 111 waits for the second storage 123 to become available (step S411: NO). When the first control unit 111 determines that the second storage 123 has become available (step S411: YES), the first control unit 111 reads the configuration information from the memory 202 of the first storage control unit 114 (step S412).

Based on the read configuration information, the first control unit 111 creates a rearrangement plan to equalize the allocated amounts q between the memory apparatuses D included in the first and the second storage 113 and 123 (step S413).

The first control unit 111 controls the first and the second storage units 112 and 122 and thereby, rearranges the arrangement of the allocated storage areas in the first and the second storage 113 and 123 according to the created rearrangement plan (step S414) and causes the series of operations according to this flowchart to come to an end.

Thus, when scale out is executed for the storage system SM, rearrangement control of the currently allocated storage areas can be executed in the first and the second storage 113 and 123.

A procedure for a second rearrangement control process executed by the first control unit 111 will be described with reference to FIG. 4B. The second rearrangement control process is a rearrangement control process executed at an arbitrary timing or periodically.

FIG. 4B is a flowchart of an example of a procedure for the second rearrangement control process executed by the first control unit 111. In the flowchart of FIG. 4B, the first control unit 111 reads the configuration information from the memory 202 of the first storage control unit 114 (step S421).

Based on the read configuration information, the first control unit 111 calculates the maximal allocated amount $q_{max}$ of the memory apparatus D whose allocated amount q is the greatest among the plural memory apparatuses D included in the first and the second storage 113 and 123 (step S422) and, based on the read configuration information, calculates the minimal allocated amount $q_{min}$ of the memory apparatus D whose allocated amount q is the least among the plural memory apparatuses D (step S423).

The first control unit 111 calculates the difference d of the maximal allocated amount $q_{max}$ and the minimal allocated amount $q_{min}$ (step S424) and determines if the calculated difference d is greater than or equal to the rate α of the maximal allocated amount $q_{max}$ (step S425). If the first control unit 111 determines that the difference d is less than the rate α of the maximal allocated amount $q_{max}$ (step S425: NO), the first control unit 111 causes the series of operations according to this flowchart to come to an end.

On the other hand, if the first control unit 111 determines that the difference d is greater than or equal to the rate α of the maximal allocated amount $q_{max}$ (step S425: YES), the first control unit 111 determines if the difference d is greater than or equal to the size β (step S426). If the first control unit 111 determines that the difference d is smaller than the size β (step S426: NO), the first control unit 111 causes the series of operations according to this flowchart to come to an end.

On the other hand, if the first control unit 111 determines that the difference d is greater than or equal to the size β (step S426: YES), the first control unit 111, based on the configuration information, creates the rearrangement plan to equalize the allocated amounts q between the memory apparatuses D included in the first and the second storage 113 and 123 (step S427).

The first control unit 111 controls the first and the second storage units 112 and 122 and thereby, rearranges the arrangement of the currently allocated storage areas in the first and the second storage 113 and 123, according to the created rearrangement plan (step S428) and causes the series of operations according to this flowchart to come to an end.

Thus, the allocation state of the storage areas of the first and the second storage 113 and 123 can be determined at an arbitrary timing or periodically, and the rearrangement control of the currently allocated storage areas can be executed in the first and the second storage 113 and 123. For example, immediately after the second storage unit 122 is added, the unevenness of the allocated amounts is determined between the first and the second storage 113 and 123. However, during operation after the addition, the unevenness of the allocated amounts can be determined among the memory apparatuses in the storage of the overall system including both the first and the second storage 113 and 123. For example, a case can also be determined where unevenness is present among the memory apparatuses in the first storage 113.

As described, according to the first control unit 111 of the first storage housing 101 of the embodiment, the rearrangement control of the currently allocated storage areas can be executed according to the degree of unevenness of the allocated amounts q in the first and the second storage 113 and 123. Thereby, access performance can be optimized accessing data stored in the storage system SM.

According to the first control unit 111, when the second storage housing 102 (the second control unit 121 and the second storage unit 122) is connected to the first storage housing 101 and thereby, the storage capacity expansion process is executed, the rearrangement control may be executed to rearrange a portion of the arrangement of the currently allocated storage area in the first storage 113, into an unallocated storage area in the second storage 123. Thus, when scale out is executed for the storage system SM, access performance can be optimized for accessing data stored before the change of the system configuration.

According to the first control unit 111, the rearrangement control of the currently allocated storage areas can be executed in the first and the second storage 113 and 123 to equalize the allocated amounts q between the memory apparatuses D included in the first and the second storage 113 and 123. Thereby, accesses to the data can be distributed to be equalized between the first and the second storage units 112 and 122.

According to the first control unit 111, the difference d is calculated between the maximal allocated amount "$q_{max}$" and the minimal allocated amount "$q_{min}$" of the memory apparatuses D included in the first and the second storage 113 and 123; and it can be determined that the predefined unevenness is present in the allocation state of the storage areas of the first and the second storage 113 and 123 if the calculated difference d is greater than or equal to a predetermined rate α of the maximal allocated amount "$q_{max}$" and is greater than or equal to the predetermined size β. Thereby, it can be determined whether the allocation state of the storage areas is uneven to the extent that rearrangement of the currently allocated storage areas in the first and the second storage 113 and 123 is desirable.

According to the first control unit 111, when, during a process of transferring data from another storage unit to the first storage unit 112, the storage capacity expansion process is executed by connecting the second control unit 121 and the second storage unit 122, the rearrangement control can be executed to rearrange a portion of the arrangement of the currently allocated storage area in the first storage 113, into an unallocated storage area in the second storage 123. Thereby, even when scale out is executed for the storage system SM during data transfer, access performance can be optimized for accessing the data stored before the change of the system configuration.

A first example of the storage system SM according to the embodiment will be described.

FIG. 5 is an explanatory diagram of an example of system configuration of the storage system SM according to the first example. In FIG. 5, the storage system SM includes processor units (PUs) #1 and #2, switches (SWs) #1 and #2, and a storage unit (SU) #1.

The PUs #1 and #2 are computers that control SUs #1 and #2. The PUs #1 and #2 are, for example, each a server accessible by a business server BS and a management server MS described later. The first control unit 111 depicted in FIG. 1 corresponds to, for example, the PU #1. The SWs #1 and #2 are computers each having a switching function.

The SU #1 includes redundant arrays of independent disks (RAIDs) #1 to #4 and is a computer to control the access of the RAIDs #1 to #4. The first storage unit 112 depicted in FIG. 1 corresponds to, for example, the SU #1.

The RAIDs #1 to #4 form a RAID group by combining plural memory apparatuses (for example, hard disks) as one memory apparatus. For example, each of the RAIDs #1 to #4 is configured by two LUNs. The first storage 113 depicted in FIG. 1 corresponds to, for example, the RAIDs #1 to #4. The memory apparatus D depicted in FIG. 1 corresponds to, for example, a LUN.

The description has been made taking the example of a case where the two PUs #1 and #2 are connected to the SU #1 for redundancy. However, one PU (for example, the PU #1 or #2) may be connected to the SU #1.

For the storage system SM, the storage area of the overall storage system SM can be expanded with increases in the storage capacity demanded of the storage system SM. For example, for the storage system SM, the storage area of the overall storage system SM may be expanded using a PU and an SU as one set.

In the description below, addition of expansion sets (PUs+SUs) each including a PU and an SU as one set, to the storage system SM may be written as "scale out"; the PUs #1 and #2, the SWs #1 and #2, and the SU #1 included in the storage system SM may each be written as "base node"; the expansion set added to the storage system SM may be written as "additional node"; and a virtual volume supplied by the storage system SM may be written as "VDISK".

FIG. 6 is an explanatory diagram of an example of configuration of the VDISK. In FIG. 6, the VDISK is an aggregate of plural segment sets. Each of the segment sets is an aggregate of eight segments #1 to #8. The capacity of the segment set is, for example, 2 [GB] and the capacity of the segment is, for example, 256 [MB].

Taking the storage system SM depicted in FIG. 5 as an example, the segments #1 to #8 are allocated to LUNs #1 to #8 in the SU #1. Data of a user is recorded in strips each having a fixed length (1 [MB]) as units. The strips are striped in a manner of using the segments #1 to #8 in this order.

Figure 7:
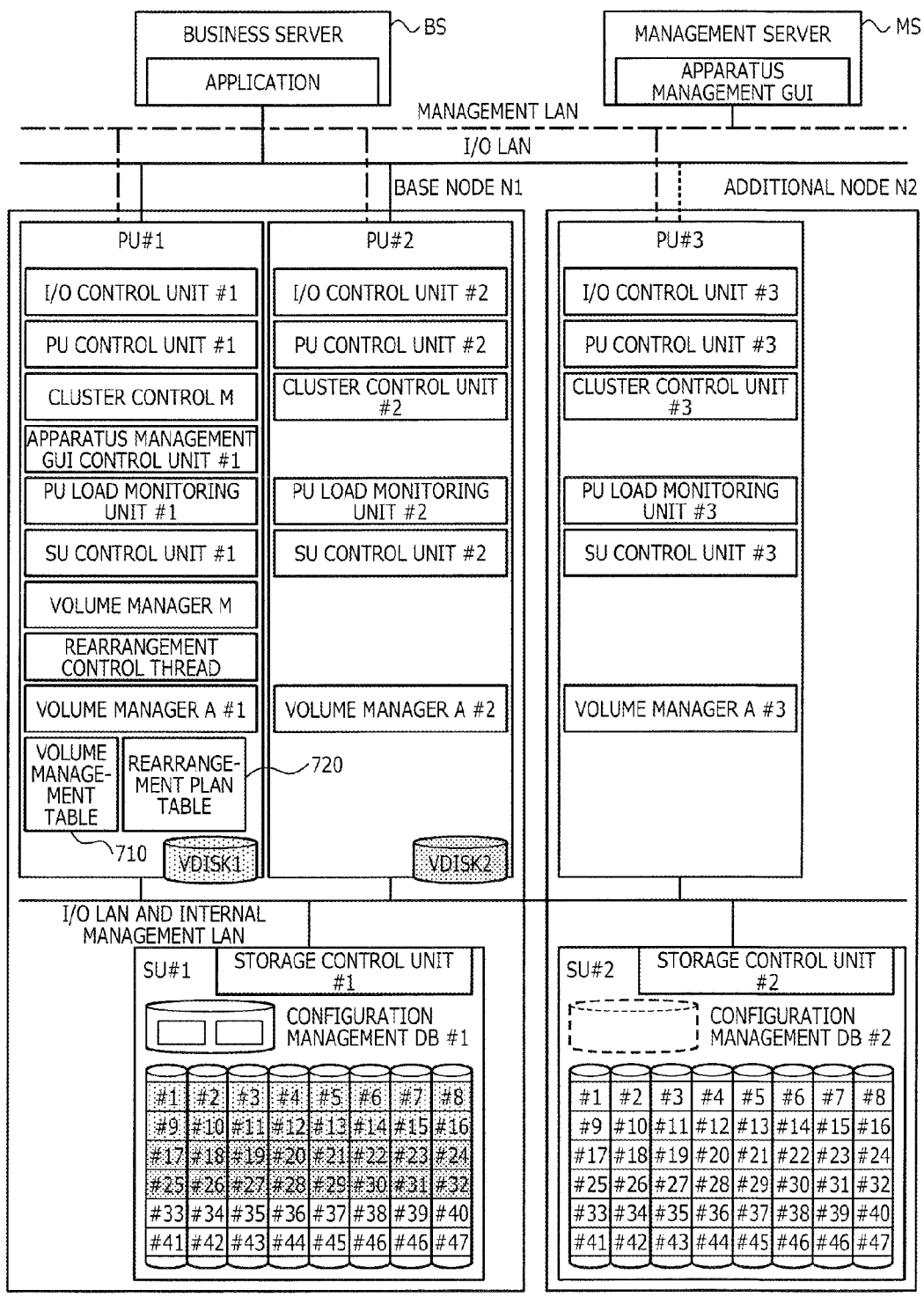
FIG. 7 is an explanatory diagram of an example of functional configuration of a PU according to the first example.

FIG. 7 is an explanatory diagram of an example of functional configuration of the PU according to the first example. In FIG. 7, the storage system SM includes a base node N1 and an additional node N2. The first storage apparatus 101 depicted in FIG. 1 corresponds to, for example, the base node N1. The second storage apparatus 102 depicted in FIG. 1 corresponds to the additional node N2. However, FIG. 7 depicts the state of the storage system SM immediately after scale out is executed therefor. The base node N1 includes the PUs #1 and #2, and the SU #1. The additional node N2 includes a PU #3 and an SU #2.

The PUs #1 and #2 in the base node N1, the PU #3 in the additional node N2, and the management server MS are connected to each other through a management LAN. The management server MS is a computer used by the manager of the storage system SM and includes an apparatus management graphical user interface (GUI).

The PUs #1 and #2 in the base node N1, the PU #3 in the additional node N2, and the business server BS are connected to each other through an I/O LAN. The business server BS is a computer having business applications installed therein.

The PUs #1, #2, and #3, and the SUs #1 and #2 are connected to each other through the I/O LAN and an internal management LAN. The SUs #1 and #2 include configuration management DBs #1 and #2, and storage control units #1 and #2. The storage control units #1 and #2 are implemented by executing a storage control program on the CPU. The "storage control program" is a program to control access to the storage in the SUs #1 and #2.

The configuration management DBs #1 and #2 each include a volume management table 710 and the rearrangement plan table 720. The volume management table 710 and the rearrangement plan table 720 are read by the PU #1 from the configuration management DB #1 (or the configuration management DB #2) and are used. The volume management table 710 includes a volume index table 800 (see FIG. 8), a mirror volume index table 900 (see FIG. 9), and a volume segment table 1000 (see FIG. 10).

The volume index table 800 is a table to manage the volumes (VDisks). The mirror volume index table 900 is a table to manage mirror volumes. The volume segment table 1000 is a table to manage the segments of the volumes. The tables 800, 900, and 1000 are correlated with each other by volume numbers as indexes.

The rearrangement plan table 720 is a table to manage the storage apparatus (SU), the LUN number, and the rearrangement state of the arrangement destination after the formulation of the plan that plans where each of the segments constituting the VDISK is arranged. The rearrangement state of the segments whose rearrangement has been completed (or whose rearrangement is unnecessary) will be represented as "rearrangement completed (or rearrangement unnecessary)". The rearrangement state of the segments currently under rearrangement will be represented as "under rearrangement". The rearrangement state of the segments to be rearranged in the future will be represented as "awaiting rearrangement".

During temporary suspension of the rearrangement, the PU #1 is maintained without deleting the rearrangement plan table 720. If the rearrangement is suspended, the PU #1 discards the rearrangement plan table 720. If the volume (VDISK) is deleted during the temporary suspension of the rearrangement, the PU #1 deletes the corresponding record from the volume index table 800 of the volume management table 710 and also deletes the corresponding record from the rearrangement plan table 720. Detailed description of the volume management table 710 and the rearrangement plan table 720 will be made later with reference to FIGS. 8 to 11.

The PU #1 includes an I/O control unit #1, a PU control unit #1, a cluster control M, an apparatus management GUI control unit #1, a PU load monitoring unit #1, an SU control unit #1, and volume managers M and A #1. The calculating unit 302, the determining unit 303, the creating unit 304, and the rearrangement control unit 305 depicted in FIG. 3 correspond to, for example, the volume manager M.

The PU #2 includes an I/O control unit #2, a PU control unit #2, a cluster control unit #2, a PU load monitoring unit #2, an SU control unit #2, and a volume manager A #2. The PU #3 includes an I/O control unit #3, a PU control unit #3, a cluster control unit #3, a PU load monitoring unit #3, an SU control unit #3, and a volume manager A #3.

The I/O control units #1 to #3 each accept an I/O request from the business server BS and each process the I/O request. The PU control units #1 to #3 respectively control the PUs #1 to #3. The cluster control M clusters the PUs. The PUs #1, #2, and #3 form a cluster. The cluster control units #2 and #3 each recognize the PUs #1 to #3 clustered by the cluster control M.

The apparatus management GUI control unit #1 determines the state of the storage system SM and creates a new volume, according to instructions from the management server MS. The PU load monitoring units #1 to #3 respectively monitor the loads on the PUs #1 to #3. The SU control units #1 to #3 control the SUs #1 and #2.

The volume manager M controls the volume managers A #1 to #3. For example, the volume manager M starts up a rearrangement control thread and causes the volume managers A #1 to #3 to execute the rearrangement control thread. The volume managers A #1 to #3 manage the volumes according to the control by the volume manager M.

When the PU #1 fails in the storage system SM, for example, the PU #2 or #3 takes over the function of the PU #1. The hardware configuration of each of the business server BS and the management server MS is implemented by, for example, a CPU, a memory, a magnetic disk drive, a magnetic disk, a display, an I/F, a keyboard, a mouse, etc.

The contents of the volume management table 710 will be described with reference to FIGS. 8 to 10. The configuration information corresponds to, for example, the volume management table 710.

FIG. 8 is an explanatory diagram of an example of the contents of the volume index table 800. In FIG. 8, the volume index table 800 has fields for the volume number, the volume name, the operating PU number, the volume attribute, the volume size, the volume state, and the rearrangement state. By setting information in each of the fields, volume information 800-1 to 800-$n$ is stored as records.

The volume number is an identifier of the VDISK. The volume name is the name of the VDISK. The operating PU number is an identifier of the PU operated by the VDISK. The volume attribute is the attribute of the VDISK. The volume size is the size (GB) of the VDISK for the business server BS. The volume state is a state representing whether the VDISK is accessible. The rearrangement state represents the rearrangement state of the VDISK.

For example, the volume information 800-1 indicates the volume name "Vdisk 1", the operating PU number "1", the volume attribute "thin-provisioning volume", the volume size "500", the volume state "normal", and the rearrangement state "under rearrangement" of the VDISK 1. Volume information having therein the volume name "NULL", such as the volume information 800-$n$, is information concerning an uncreated VDISK.

FIG. 9 is an explanatory diagram of an example of the contents of the mirror volume index table 900. In FIG. 9, the mirror volume index table 900 has fields for the volume number, the number of mirrors, and mirror volume numbers 1 and 2. By setting information in each of the fields, mirror volume information (for example, mirror volume information 900-1 and 900-2) is stored as records.

The volume number is an identifier of the mirror volume. The number of mirrors is the number of mirroring volumes. The mirror volume numbers 1 and 2 are each an identifier of the VDISK that is the substance of the mirror volume. For example, the mirror volume information 900-1 indicates the number of mirrors "two", the mirror volume number 1 "127", and the mirror volume number 2 "128" of the VDISK 5.

Figure 10:
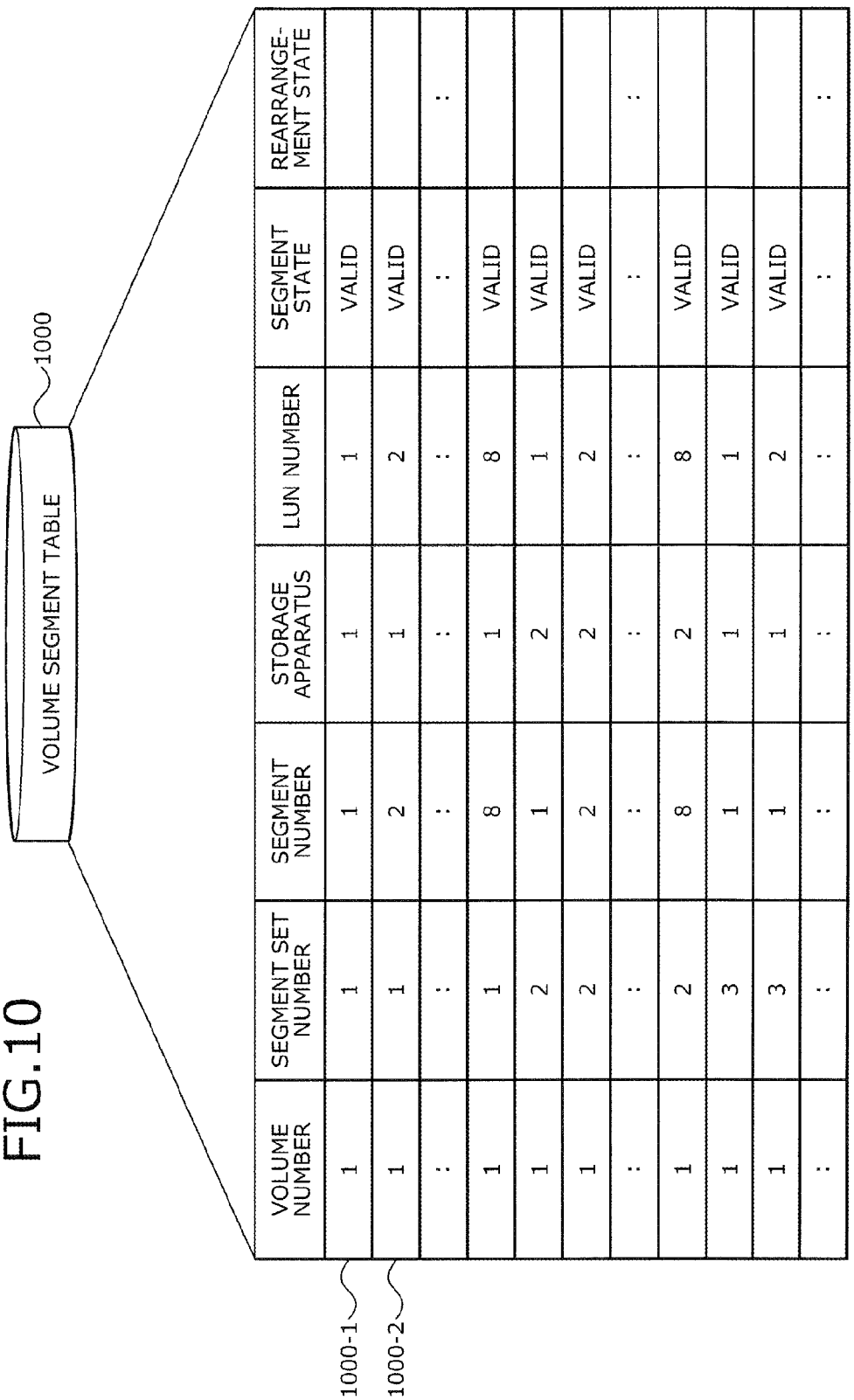
FIG. 10 is an explanatory diagram of an example of the contents of a volume segment table 1000.

FIG. 10 is an explanatory diagram of an example of the contents of the volume segment table 1000. In FIG. 10, the volume segment table 1000 has fields for the volume number, the segment set number, the segment number, the storage apparatus, the LUN number, the segment state, and the rearrangement state. By setting information in each of the fields, segment information (for example, segment information 1000-1 and 1000-2) is stored as records.

The volume number is an identifier of the VDISK. The segment set number is an identifier of the segment set constituting the VDISK. The segment number is an identifier of a segment constituting the segment set. The storage apparatus is an identifier of the SU to which the segment belongs. The LUN number is an identifier of the LUN to which the segment is allocated. The segment state is a state representing whether the segment is accessible. The rearrangement state represents the rearrangement state of the segments.

For example, the segment information 1000-1 indicates the storage apparatus "1", the LUN number "1", the segment state "valid", and the rearrangement state "blank (empty)" of a segment 1 of a segment set 1 of the VDISK 1.

The contents of the rearrangement plan table 720 will be described with reference to FIG. 11.

FIG. 11 is an explanatory diagram of an example of the contents of the rearrangement plan table 720. In FIG. 11, the rearrangement plan table 720 has fields for the volume number, the segment set number, the segment number, the current storage apparatus, the current LUN number, the rearranged storage apparatus, the rearranged LUN number, and the rearranged state. By setting information in each of the fields, rearrangement plan information (for example, rearrangement plan information 1100-1 to 1100-5) is stored as records.

The volume number is an identifier of the VDISK. The segment set number is an identifier of the segment set constituting the VDISK. The segment number is an identifier of a segment constituting the segment set. The current storage apparatus is an identifier of the SU to which the segment before the rearrangement belongs. The current LUN number is an identifier of the LUN to which the segment before the rearrangement is allocated. The rearranged storage apparatus is an identifier of the SU to which the segment after the rearrangement belongs. The rearranged LUN number is an identifier of the LUN to which the segment after the rearrangement is allocated. The rearranged state represents the rearrangement state of the segments.

For example, the rearrangement plan information 1100-1 indicates the current storage apparatus "1", the current LUN number "1", the rearranged storage apparatus "1", the rearranged LUN number "1", and the rearrangement state "rearrangement unnecessary" of the segment 1 of the segment set 1 of the VDISK 1.

An example of determination of the unevenness of the allocated amounts q of the segments of each LUN in the storage system SM will be described. The PU #1 monitors the allocated amounts q of the segments of each LUN in the storage system SM. If the PU #1 detects that "unevenness is present", using the apparatus management GUI control unit, the PU #1 gives notification that the unevenness has occurred. The trigger of the monitoring may be, for example, a change of the system configuration associated with the addition of a node, arrival of the time for periodic monitoring, or an increase of the load capacity of the SU.

For example, the PU #1 refers to the volume management table 710; calculates the allocated amount q of the segments of each LUN in the storage system SM; and identifies the maximal allocated amount $q_{max}$ of the LUN whose allocated amount q of the segments is the greatest and the minimal allocated amount $q_{min}$ of the LUN whose allocated amount q of the segments is the least, among all the LUNs in the storage system SM.

When the difference d of the maximal allocated amount $q_{max}$ and the minimal allocated amount $q_{min}$ is greater than or equal to the predetermined rate $\alpha$ of the maximal allocated amount $q_{max}$ and is greater than or equal to the predetermined size $\beta$, the PU #1 determines that the unevenness is present in the allocated amount q of the segments in each LUN in the storage system SM. The predetermined rate α and the predetermined size β can each be arbitrarily set. The rate α is set to be, for example, a value that is about five to 10[%]. The size β is set to be, for example, a value that is about 64 or 128 [GB].

The rearrangement plan of the volume (VDISK) will be described. The PU #1 formulates the rearrangement plan based on the allocated amount q of the segments in the LUN constituting the SU. Therefore, equalizing rearrangement can be executed even when the load capacity of the SU to be added is different from that of the existing SU.

FIG. 12 is an explanatory diagram of an example of a rearrangement plan for a volume. As depicted for item 1 of FIG. 12, the case is assumed where an expansion set (the SU #2) of 8.4 [TB] is added to a basic set (the SU #1) of 8.4 [TB]. In this case, the PU #1 performs distribution and rearrangement such that the allocated amount q of the segments of each LUN is equalized between the SUs #1 and #2.

As depicted for item 2 of FIG. 12, the case is assumed where an expansion set (the SU #2) of 16.8 [TB] is added to the basic set (the SU #1) of 8.4 [TB]. In this case, the PU #1 performs distribution and rearrangement such that the allocated amount q of the segments of each LUN is equalized between the SUs #1 and #2.

As depicted for item 3 of FIG. 12, the case is assumed where an expansion set (the SU #3) of 16.8 [TB] is added to the basic set (the SU #1) of 8.4 [TB] and the expansion set (the SU #2) of 8.4 [TB]. In this case, the PU #1 performs distribution and rearrangement such that the allocated amount q of the segments of each LUN is equalized among the SUs #1, #2, and #3. Although a case has been described where the expansion set including the PU and the SU as one set is added, the SU alone may be added as an expansion set.

How the existing volumes are rearranged for the SU #2 added for scale out will be described with reference to FIG. 13. A case will be described where the rearrangement process is automatically started up after scale out. Nonetheless, a rearrangement instruction can manually be issued from a GUI screen on the management server MS.

FIG. 13 is an explanatory diagram (Part I) of an example of rearrangement of the volumes. In FIG. 13, segments A0 to A31 constituting a volume 1 and segments B0 to B15 constituting a volume 2 are arranged in the SU #1 (in FIG. 13, "before rearrangement"). In FIG. 13, the cylindrical columns in the SUs #1 and #2 represent the LUNs in the SUs #1 and #2.

The PU #1 creates the rearrangement plan table 720 such that the allocated amount q of the segments in each LUN is equalized between the SUs #1 and #2 (in FIG. 13, "rearrangement proposal"). The disposed positions of the segments are tentative positions.

The PU #1 refers to the rearrangement plan table 720 and rearranges the segments A0 to A31 of the volume 1. In this case, the segments A8 to A15 and A24 to A31 of the volume 1 are rearranged in the SU #2 (in FIG. 13, "under rearrangement").

The PU #1 refers to the rearrangement plan table 720 and rearranges the segments B0 to B15 of the volume 2. In this case, the segments B8 to B15 of the volume 2 are rearranged into the SU #2 (in FIG. 13, "after rearrangement"). Thereby, the physical capacities are equalized between the SUs #1 and #2.

Although the use state of the LUNs seems to be discrete, no problem arises with regard to performance when the volume is configured by the segments that are wide-striped. The discreteness of the use state of the LUNs does not affect performance. Therefore, to also avoid unnecessary transfer, not transferring the segments A16 to A23 and B0 to B7 reduces wasteful processing for the apparatus.

For a case where the rearrangement process is desired to be temporarily suspended due to maintenance and inspection, etc., of the PUs or the SUs, the storage system SM has a temporary suspension function and a restart function for the rearrangement process, and also has a suspension function for the rearrangement process. However, when the rearrangement process is suspended, the created rearrangement plan has to be discarded and when the rearrangement is again executed, processes are executed for determining unevenness of the allocated amount q of the segments of each LUN in the storage system SM and for creating a re-plan table.

In contrast, when the temporary suspension function is used, during the temporary suspension of the rearrangement, the PU #1 does not discard and retains the rearrangement plan established for the rearrangement of the volumes. When the PU #1 receives a restart instruction, the PU #1 refers to the volume management table 710 and the rearrangement plan table 720, and continues the rearrangement process from the entry to be restarted with. Thereby, temporary suspension during rearrangement and restart from the temporary suspension are enabled.

An example of updating of each of the tables 710 and 720 will be described with reference to FIGS. 14 to 17.

Figure 14:
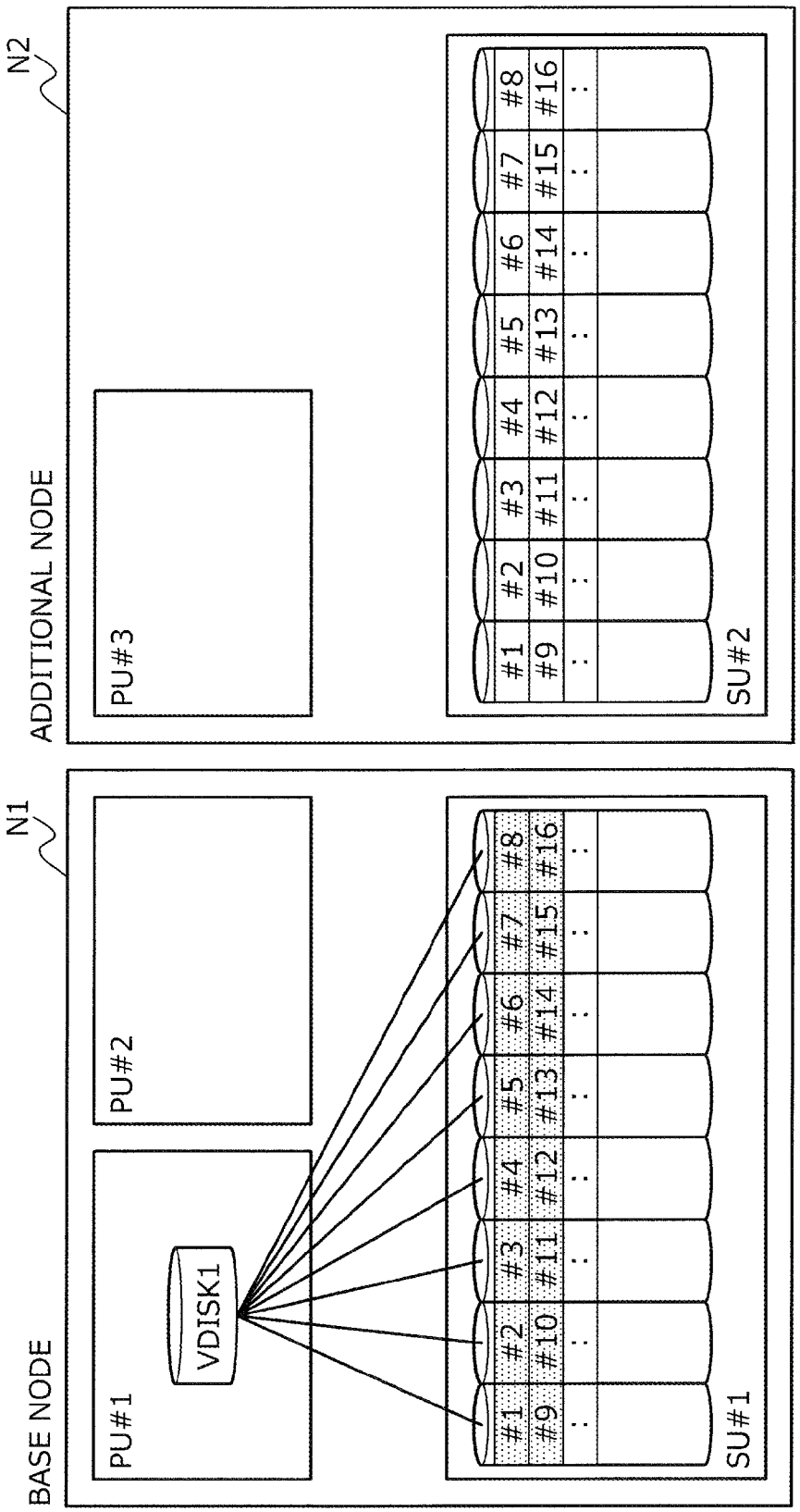
FIG. 14 is an explanatory diagram of an example of arrangement of the volumes.

FIG. 14 is an explanatory diagram of an example of arrangement of the volumes. In FIG. 14, the segments #1 to #16 constituting the VDISK 1 are arranged in the SU #1. The additional node N2 including the PU #3 and the SU #2 as the set is added to the base node N1. In this case, unevenness occurs in the allocated amounts q of the segments of each LUN in the storage system SM and therefore, the rearrangement process is executed for the VDISK 1.

FIG. 15 is an explanatory diagram of an example of updating of the volume index table 800. In FIG. 15, when the additional node N2 is added to the base node N1, the rearrangement state in volume information 1500-1 in the volume index table 800 is updated from "awaiting rearrangement" to "under rearrangement".

FIG. 16 is an explanatory diagram of an example of updating of the volume segment table 1000. In (16-1) of FIG. 16, the volume segment table 1000 stores the segment information on the VDISK 1 of the volume number "1". Eight segments constituting the segment set basically are sequentially arranged in eight different LUNs (for example, indicated by thick-lined frames in FIG. 16).

However, when a volume is present that was created before the VDISK 1 is created, a LUN may be allocated to the VDISK 1 at the timing at which the LUN allocated to the volume is deleted. In this case, when LUNs with serial numbers are not empty, the LUNs to be arranged with the segments constituting the segment set may not be equalized (for example, indicated by a dotted line frame in FIG. 16).

In (16-2) of FIG. 16, when the rearrangement plan table 720 (for example, see FIG. 17 described later) is created, the volume manager M of the PU #1 sets the rearrangement state in the volume segment table 1000 to be "during rearrangement process", refers to the rearrangement plan table 720, creates the rearrangement control thread for each PU for the segments whose rearrangement states are each "awaiting rearrangement", and executes the rearrangement.

The rearrangement control thread of each PU instructs the volume manager A to execute a copying process for the segments to be rearranged in the rearrangement. When the volume manager A responds to the rearrangement control thread indicating the completion of the copying, the volume manager M changes the rearrangement state in the rearrangement plan table 720 to "rearrangement completed" and also changes the rearrangement state of the volume segment table 1000 to "blank".

Figure 17:
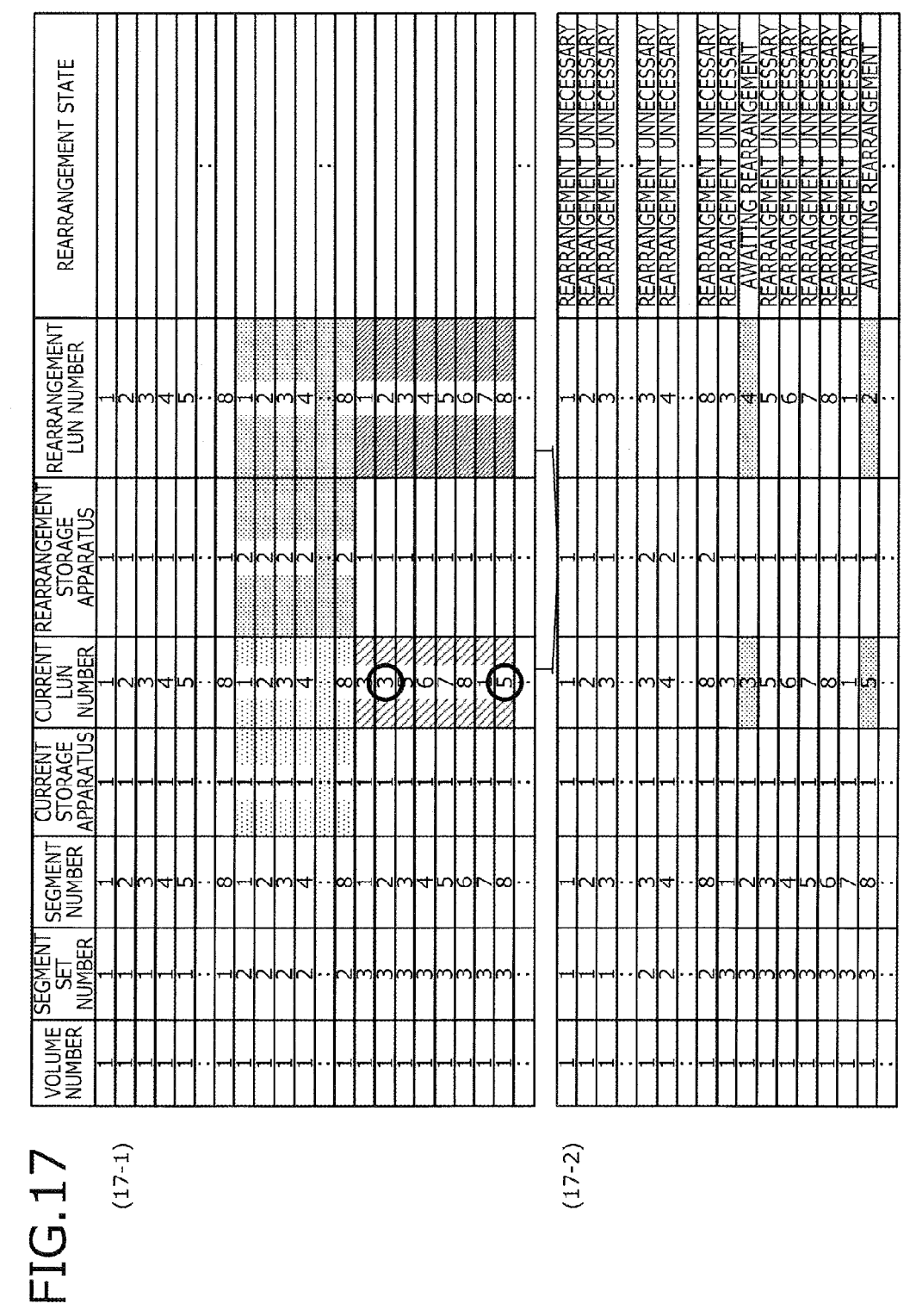

FIG. 17 is an explanatory diagram of an example of updating of the rearrangement plan table 720. In (17-1) of FIG. 17, the PU #1 allocates the segment sets of the VDISK 1 to all the SUs using each segment set as a unit; also allocates the segments thereto; and establishes a plan to allocate the LUN numbers using serial LUN numbers. For example, the PU #1 plans to allocate the even-numbered segments to consecutive LUNs of the SU #2 and also plans to allocate the odd-numbered segments to consecutive LUNs of the SU #1.

In (17-2) of FIG. 17, the PU #1 mechanically establishes a rearrangement plan as above and thereafter, reviews the rearrangement plan to reduce the copying processes for data transfer consequent to the rearrangement. For example, the PU #1 compares for each segment set, the current state (the current storage apparatuses and the current LUN numbers) and the state after the rearrangement (the rearranged storage apparatuses and the rearranged LUN numbers).

For example, for the segment set number "3", the current LUN numbers do not match with all the rearranged LUN numbers while, for the current LUN numbers, the segments are each allocated to a LUN that is different from each other except two segments that are allocated to the same LUN number. Therefore, the PU #1 again creates a plan such that the two segments allocated to the same LUN are allocated to different LUNs (although, for the LUN numbers, the order is not same as that of the segments, it is determined that the performance is not affected when the segments are each allocated to a LUN that is different from each other).

For the segments to be rearranged, the PU #1 sets the rearrangement state thereof to be "awaiting rearrangement" and sets the rearrangement state in the volume segment table 1000 to be "during rearrangement process". For the segments whose rearrangement is unnecessary, the PU #1 sets the rearrangement state in the rearrangement plan table 720 to be "rearrangement unnecessary".

The rearrangement plan that reduces the copying processes to transfer the segments consequent to rearrangement in the same SU will be described. The plan for rearrangement in the same SU is created, for example, after the rearrangement plan for SUs is executed to equalize the allocated amounts q of the segments of each LUN among the SUs.

Figure 18:
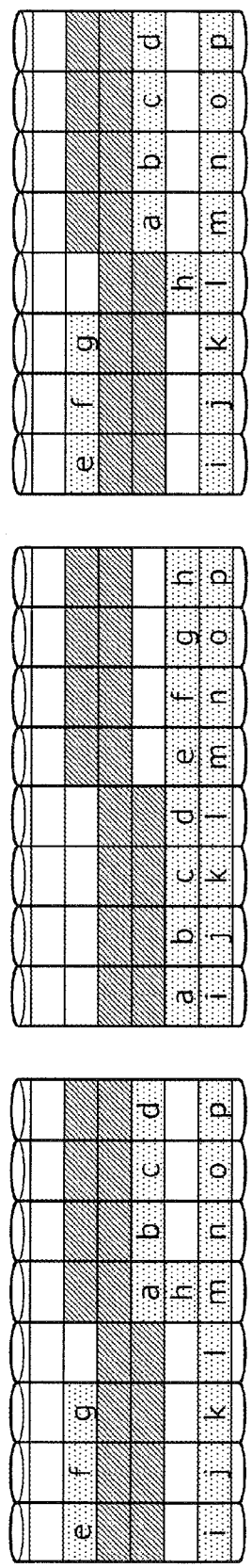
FIG. 18 is an explanatory diagram (Part II) of the example of rearrangement of the volumes.

FIG. 18 is an explanatory diagram (Part II) of the example of rearrangement of the volumes. In FIG. 18, it is assumed that a segment set constituted of segments "a" to "p" is disposed as that "before the rearrangement" in an SU (for example, the SU #1). In this case, for example, the PU #1 can line up the segments a to h using an unused area of segments (white squares in FIG. 18) and segments made unused by the transfer of the segments, as that of "rearrangement proposal". In FIG. 18, the black squares each represent a used area of the segment.

However, the RAID groups to which the segments "a" to d and e to g are arranged differ from each other and therefore, when only the segment h is transferred to the other RAID group, the performance is sufficiently improved from the viewpoint of the IO access performance. Therefore, the PU #1 establishes a rearrangement plan to transfer only the segment h.

As a result, only the segment h is transferred to another LUN as represented by "after rearrangement" and the segments are equalized among the LUNs. In this manner, the rearrangement plan is established to reduce the copying processes to transfer the segments consequent to the rearrangement in the same SU and thereby, the access performance can be improved suppressing extra transfers of the segments. Access between the PU and SU can be reduced for the rearrangement.

An example of the details of the rearrangement process of the volumes will be described. Each PU controls the rearrangement process such that the business operation is not obstructed by the use of internal line bandwidth for moving segments and the influence of the CPU loads of the PUs, caused by the rearrangement process.

For example, the PU (for example, the PU #1) determines whether the number of accesses per second from the business server BS (input output per second: IOPS) reaches the maximal IOPS that can be processed by the PU. If the PU determines that the IOPS from the business server BS reaches the maximal IOPS, the PU does not execute the rearrangement process and prioritizes the business IOs.

On the other hand, if the PU determines that the IOPS from the business server BS has not reached the maximal IOPS, the PU executes the rearrangement process using an unused portion of the IOPS. The "unused portion of the IOPS" refers to the portion acquired by subtracting the current IOPS from the maximal IOPS. Thereby, the rearrangement of the volumes can be executed minimizing the influence on the business operation and without discontinuing the business operation.

However, it can be considered that the IOPS of the business IO is reduced by the use of the bandwidth between the PU and SU, and by the increase of the CPU loads of the PU caused by the execution of the rearrangement process. The PU may enable the business IOPS to be maintained by not only monitoring the difference between the current IOPS and the maximal IOPS of the PU but also by thinning the rearrangement process when the reduction rate of the current IOPS exceeds a predetermined rate (for example, 15[%]) due to the rearrangement process.

For example, as below, when the current IOPS is greater than or equal to 95% of the maximal IOPS, the PU may insert a sleep (for example, waiting for about one to five [sec]) into the process, to suppress the rearrangement process. "x" represents the maximal IOPS of the PU and "y" represents the current IOPS. The maximal IOPS of the PU is set in advance.

0.95x≥ The rearrangement process is caused to sleep.
095> The rearrangement process is operated.

When the PU causes the rearrangement to operate and thereby, "0.85 (immediately previous y)≤(the current y)" is established, the PU inserts the sleep into the rearrangement process and thereby, suppresses the affect on the business operation. The "immediately previous y" is, for example, the current IOPS acquired immediately before the rearrangement process.

Procedures for various processes of the storage system SM according to the first example will be described. The procedure for a node addition process for the storage system SM will be described. The procedure for the node addition process for the storage system SM will be described taking an example of a case where the additional node N2 is added to the base node N1.

Figure 19:
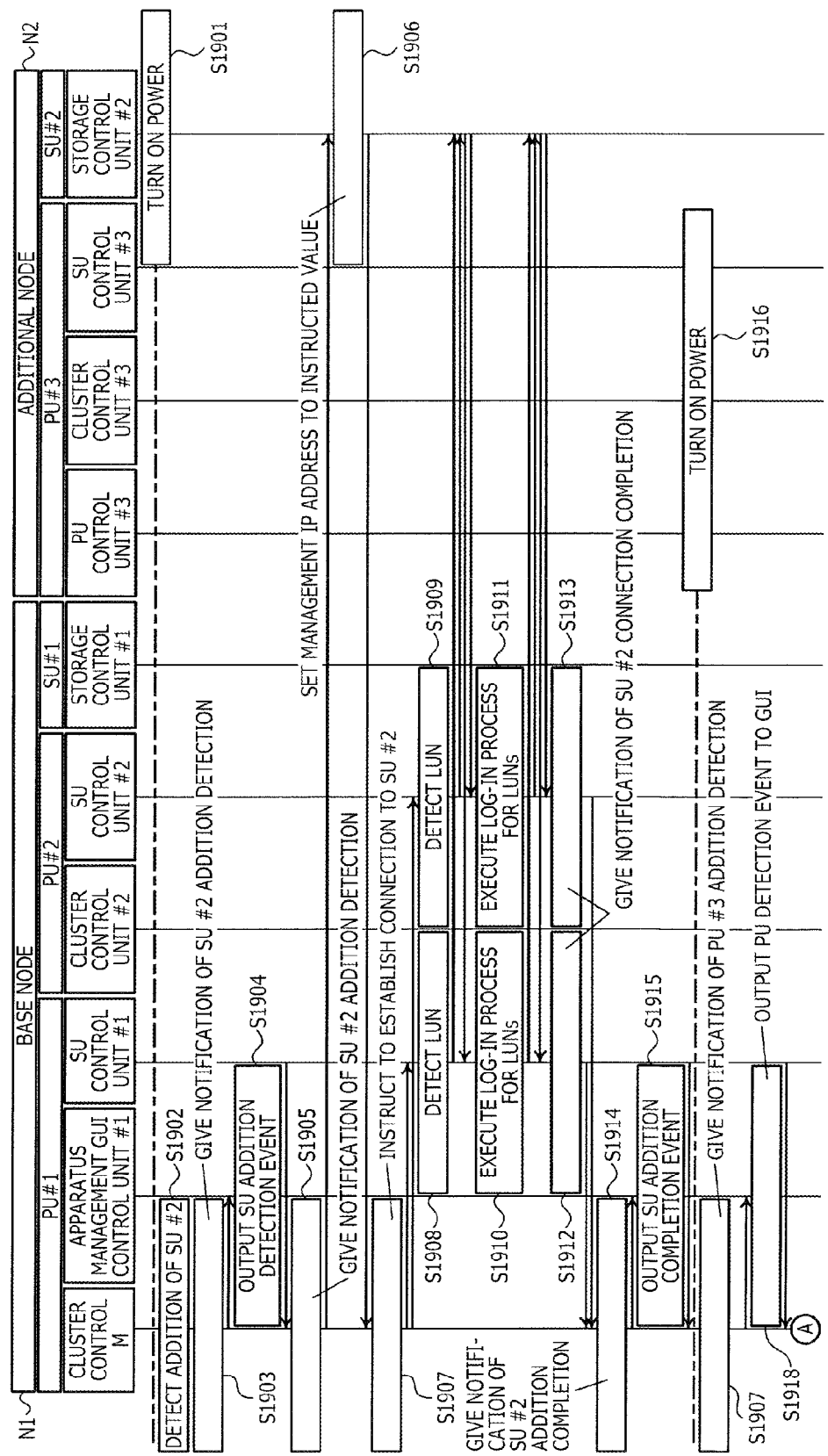
FIGS. 19 and 20 are sequence diagrams of an example of a procedure for a node addition process for the storage system SM.
Figure 20:
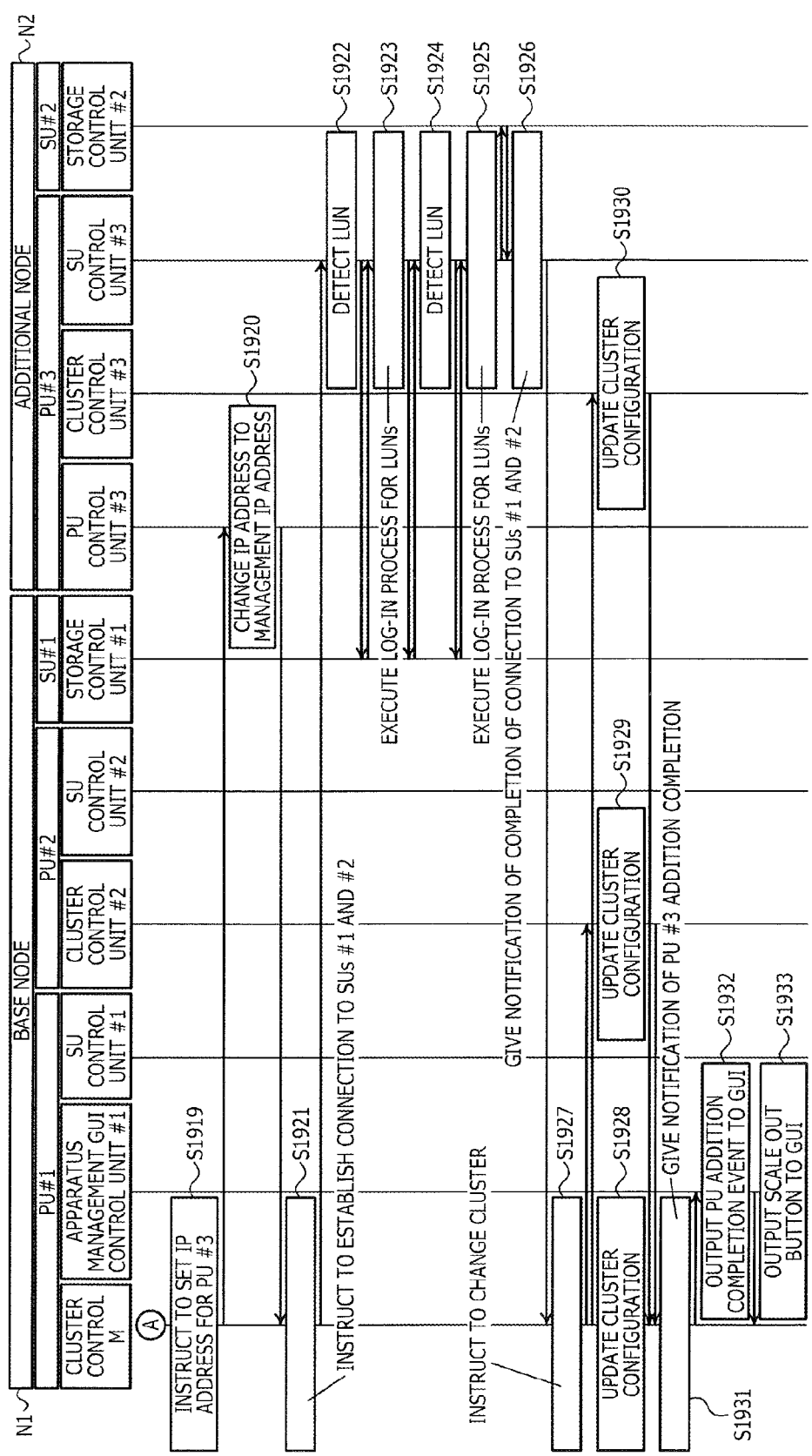
Figure 21:
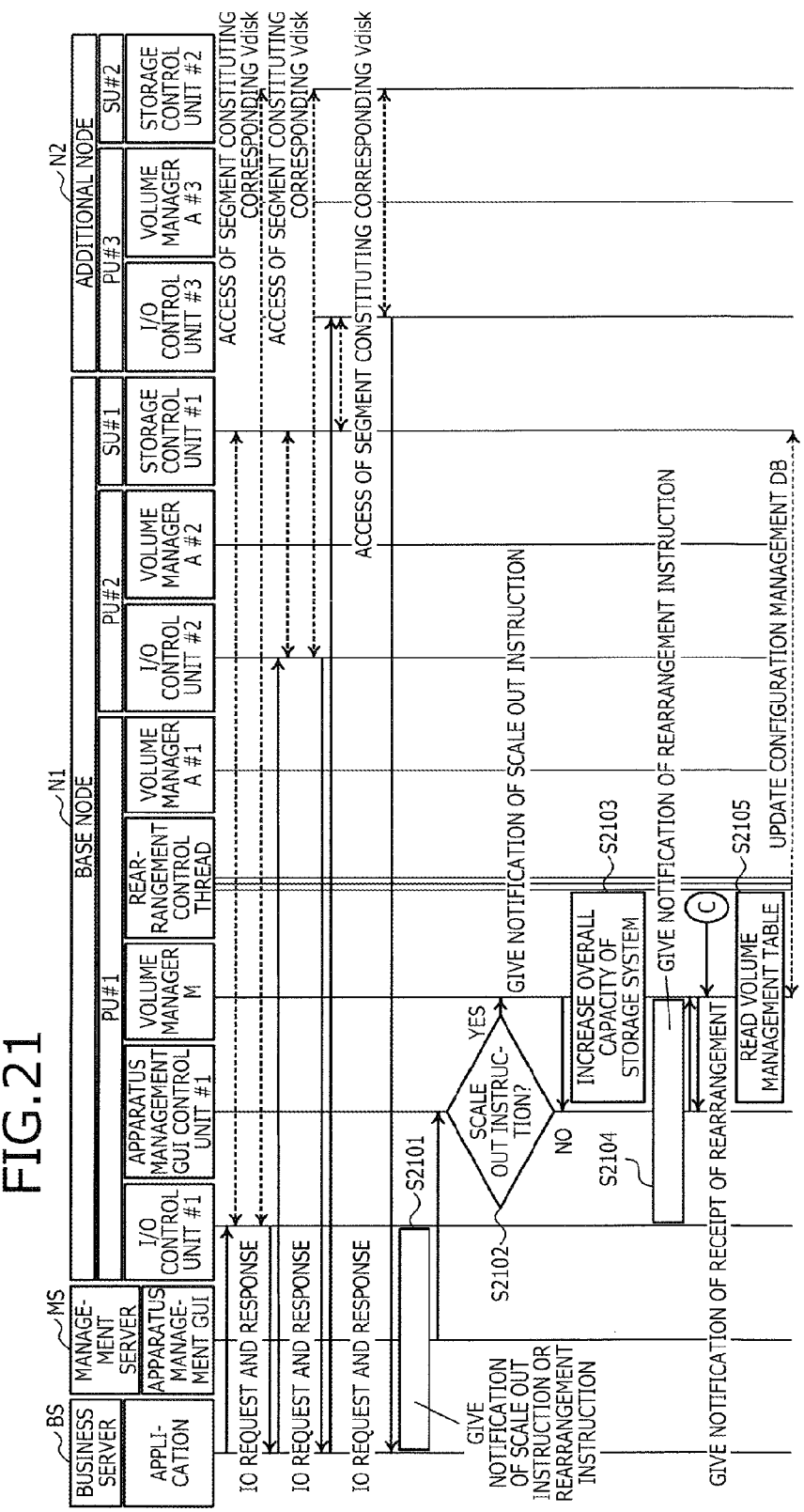
FIGS. 21, 22, 23, and 24 are sequence diagrams of an example of a procedure for a rearrangement process for the storage system SM.

FIGS. 19 and 20 are sequence diagrams of an example of the procedure for the node addition process for the storage system SM. In the sequence diagram of FIG. 19, a customer engineer (CE) physically connects the additional node N2 to the base node N1 and turns on the power of the SU #2 (step S1901).

The cluster control M detects the addition of the SU #2 (step S1902) and notifies the apparatus management GUI control unit #1 of the detection of the addition of the SU #2 (step S1903). The apparatus management GUI control unit #1 outputs an SU addition detection event to the GUI of the management server MS (step S1904).

The cluster control M instructs the storage control unit #2 of the SU #2 to allocate a new management IP address (step S1905). The storage control unit #2 of the SU #2 sets the value of the management IP address to be the instructed value (step S1906). The cluster control M instructs the SU control units #1 and #2 respectively of the PUs #1 and #2 to establish connections to the SU #2 (step S1907).

The SU control unit #1 detects the LUN for the management DB and the LUN for user data of the SU #2 (step S1908). The SU control unit #2 detects the LUN for the management DB and the LUN for the user data of the SU #2 (step S1909). The SU control unit #1 executes a log-in process for the detected LUNs (step S1910). The SU control unit #2 executes the log-in process for the detected LUNs (step S1911).

The SU control unit #1 notifies the cluster control M of the completion of the connection to the SU #2 (step S1912). The SU control unit #2 notifies the cluster control M of the completion of the connection to the SU #2 (step S1913). The cluster control M notifies the apparatus management GUI control unit #1 of the completion of the addition of the SU #2 (step S1914). The apparatus management GUI control unit #1 outputs an SU addition completion event to the GUI of the management server MS (step S1915).

The CE turns on the power of the PU #3 of the additional node N2 (step S1916). When the cluster control M detects the addition of the PU #3, the cluster control M notifies the apparatus management GUI control unit #1 of the detection of the addition of the PU #3 (step S1917) and outputs a PU detection event to the GUI of the management server MS (step S1918).

In the sequence diagram of FIG. 20, the cluster control M instructs the PU control unit #3 to set an IP address for the detected PU #3 (step S1919). The PU control unit #3 changes the IP address to a management IP address (step S1920). The cluster control M instructs the SU control unit #3 of the PU #3 to establish a connection to the SUs #1 and #2 (step S1921).

The SU control unit #3 detects the LUN for the management DB and the LUN for the user data of the SU #1 (step S1922), executes the log-in process for the detected LUNs (step S1923), and detects the LUN for the management DB and the LUN for the user data of the SU #2 (step S1924).

The SU control unit #3 executes the log-in process for the detected LUNs (step S1925) and notifies the cluster control M of the completion of the connection to the SUs #1 and #2 (step S1926). The cluster control M instructs the cluster control units #2 and #3 respectively of the PUs #2 and #3 to change the cluster (step S1927).

The cluster control M incorporates the PU #3 into the cluster management information and thereby, updates the cluster configuration to that including the PUs #1, #2, and #3 (step S1928). The cluster control unit #2 incorporates the PU #3 into the cluster management information and thereby, updates the cluster configuration to that including the PUs #1, #2, and #3 (step S1929). The cluster control unit #3 incorporates the PU #3 into the cluster management information and thereby, updates the cluster configuration to that including the PUs #1, #2, and #3 (step S1930).

The cluster control M notifies the apparatus management GUI control unit #1 of the completion of the addition of the PU #3 (step S1931). The apparatus management GUI control unit #1 outputs a PU addition completion event to the GUI of the management server MS (step S1932) and outputs a scale out button to the GUI of the management server MS (step S1933).

When a user clicks the "scale out button" on the GUI of the management server MS, meaning that the user approves the completion of the connection and the internal apparatus incorporation, the addition process is completed. Consequent to the completion instruction for the scale out, the storage capacity as the storage system SM can be increased by an amount of the SU #2 and new data can also be stored in the SU #2.

A procedure for the rearrangement process of the storage system SM will be described. The rearrangement process is executed, for example, after the scale out of the storage system SM is completed or when a rearrangement instruction is issued from the GUI screen on the management server MS.

FIGS. 21, 22, 23, and 24 are sequence diagrams of an example of the procedure for the rearrangement process for the storage system SM. In the sequence diagram of FIG. 21, the apparatus management GUI of the management server MS notifies the apparatus management GUI control unit #1 of the PU #1 of a scale out instruction or a rearrangement instruction (step S2101). Notification of a scale out instruction is given, for example, when the "scale out button" on the GUI screen is clicked. Notification of a rearrangement instruction is given, for example, when a "rearrangement button" on the GUI screen is clicked.

The apparatus management GUI control unit #1 of the PU #1 determines whether the apparatus management GUI control unit #1 has received a scale out instruction (step S2102). If the apparatus management GUI control unit #1 determines that the apparatus management GUI control unit #1 has received a scale out instruction (step S2102: YES), the apparatus management GUI control unit #1 notifies the volume manager M of the scale out instruction and the volume manager M adds a capacity corresponding to that of the added SU #2 to the overall capacity of the storage system SM and thereby, sets the area of the SU #2 to also be available (step S2103).

On the other hand, if the apparatus management GUI control unit #1 determines that the apparatus management GUI control unit #1 has received a rearrangement instruction (step S2102: NO), the apparatus management GUI control unit #1 notifies the volume manager M of the rearrangement instruction (step S2104). The volume manager M reads the volume management table 710 from the configuration management DB (step S2105).

Figure 22:
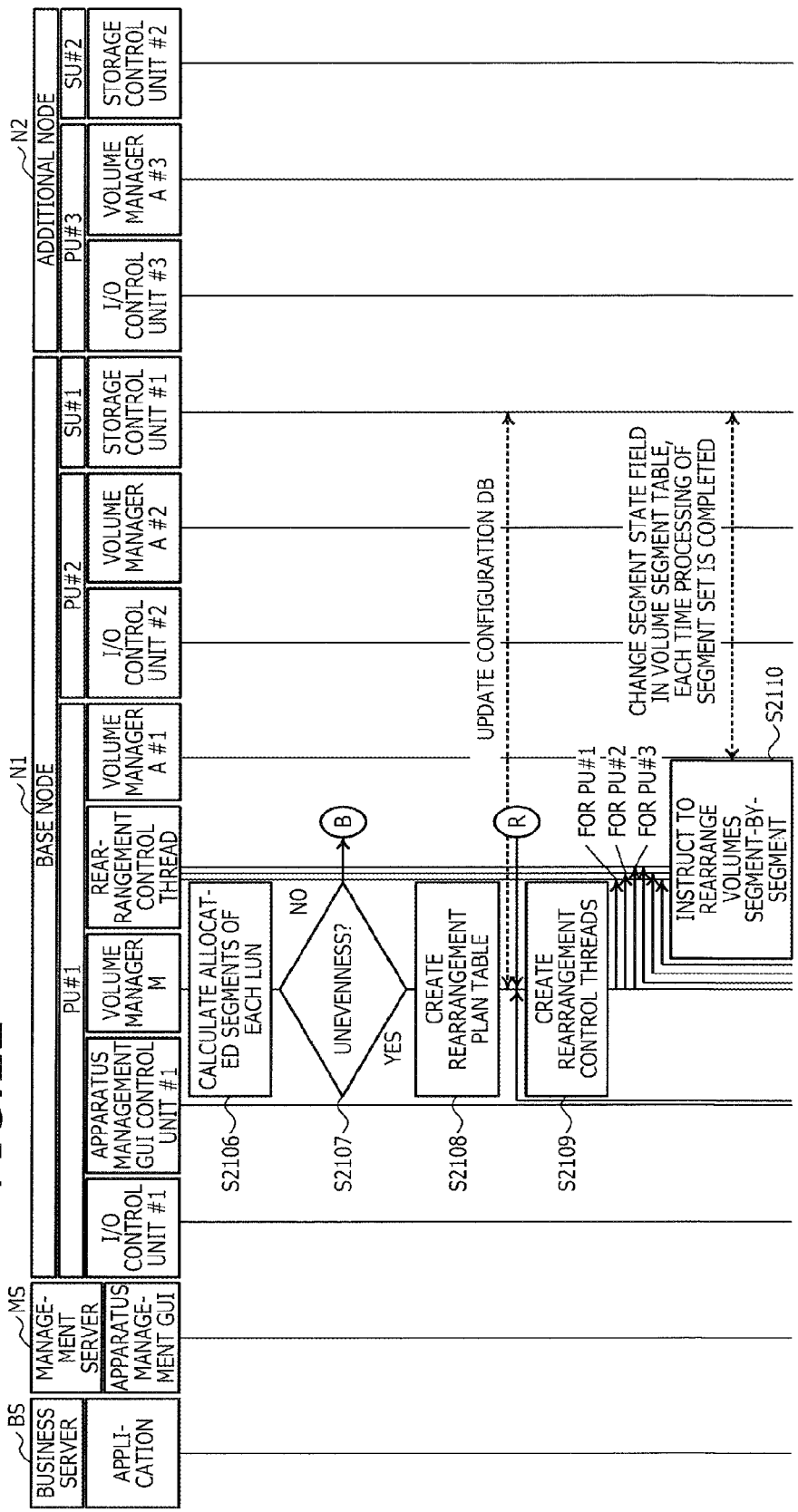

In the sequence diagram of FIG. 22, the volume manager M refers to the volume management table 710 and calculates the allocated amount q of the segments of each LUN in the storage system SM (step S2106). The volume manager M determines whether unevenness of the allocated amount q of the segments of each LUN in the storage system SM is present, based on the calculated allocated amount q of the segments of each LUN (step S2107).

If the volume manager M determines that no unevenness is present (step S2107: NO), the volume manager M progresses to the process at step S2119 of FIG. 24. On the other hand, if the volume manager M determines that unevenness is present (step S2107: YES), the volume manager M establishes a rearrangement plan and creates the rearrangement plan table 720 (step S2108). In this case, the volume manager M sets the rearrangement state in the rearrangement plan table 720 to be "awaiting rearrangement" and also sets the rearrangement state in the volume segment table 1000 to be "during rearrangement process", for the segments to be rearranged.

The volume manager M refers to the rearrangement plan table 720 and creates the rearrangement control threads for the PUs #, #2 , and #3 (step S2109). The rearrangement control threads for the PUs #1, #2, and #3 instruct the volume managers A #1, #2, and #3 of the PUs #1, #2, and #3 to rearrange segment-by-segment, the volumes instructed by the volume manager M (step S2110).

For example, the rearrangement control threads for the PUs #1, #2, and #3 respectively notify the volume managers A #1, #2, and #3 of the PUs #1, #2, and #3 of information concerning disks that are to be rearranged (information to identify the disks, and the segments to be transferred) and information concerning the destinations to which the segments are to be transferred.

Figure 23:
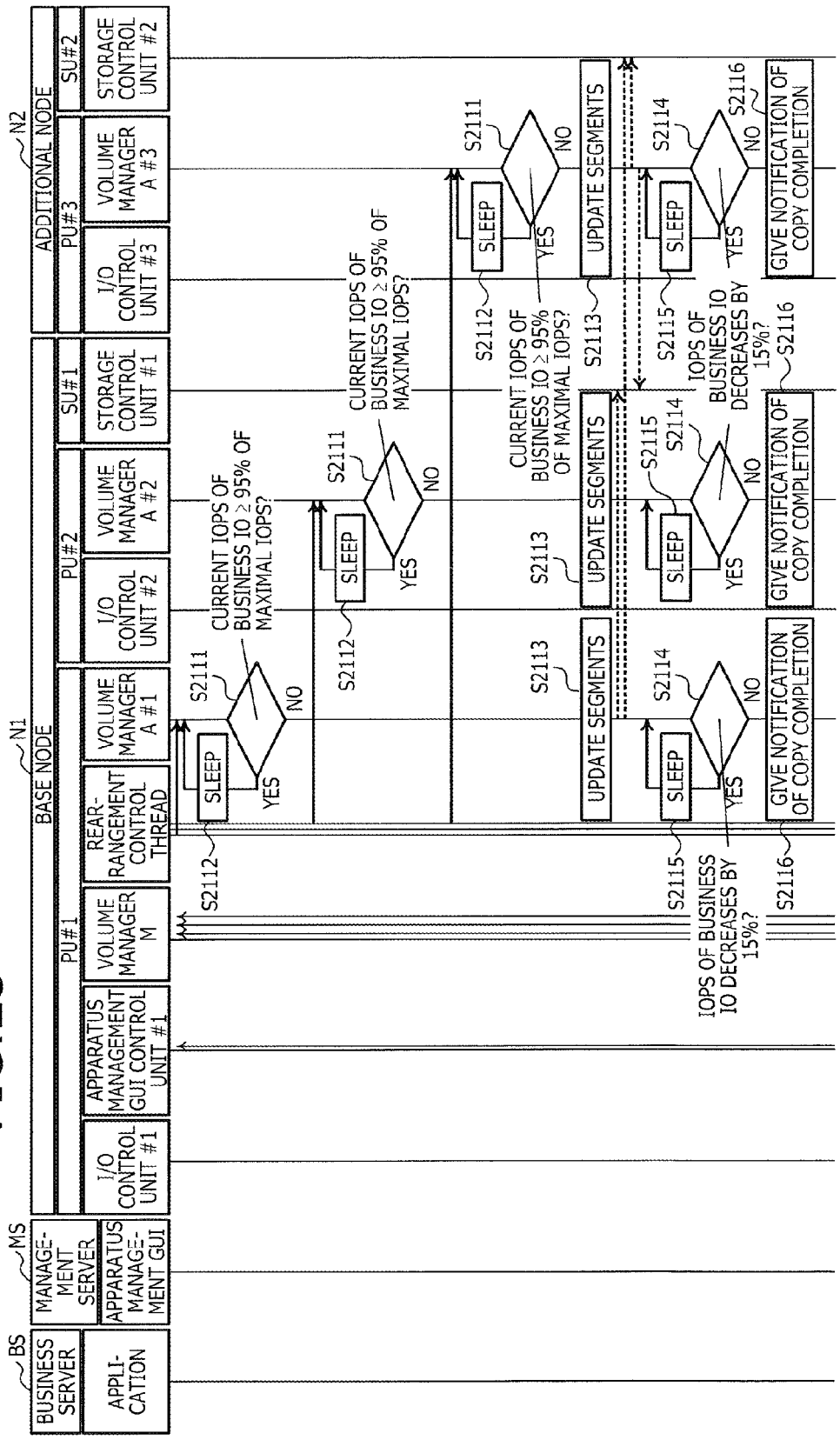

In the sequence diagram of FIG. 23, the volume managers A #1, #2, and #3 determine whether the current IOPS of the business IO is greater than or equal to 95% of the maximal IOPS (step S2111). If the volume managers A #1, #2, and #3 determine that the current IOPS is greater than or equal to 95% of the maximal IOPS (step S2111: YES), the volume managers A #1, #2, and #3 sleep for a specific time period (step S2112) and return to the process at step S2111.

On the other hand, if the volume managers A #1, #2, and #3 determine that the current IOPS is lower than 95% of the maximal IOPS (step S2111: NO), the volume managers A #1, #2, and #3 execute copying of the segments according to the instruction and thereby, update the instructed segments (step S2113).

The volume managers A #1, #2, and #3 determine whether the IOPS of the business IO decreases by 15% (step S2114). If the volume managers A #1, #2, and #3 determine that the IOPS decreases by 15% (step S2114: YES), the volume managers A #1, #2, and #3 sleep for a specific time period (step S2115) and return to the process at step S2114.

On the other hand, if the volume managers A #1, #2, and #3 determine that the IOPS does not decrease by 15% (step S2114: NO), the volume managers A #1, #2, and #3 respectively give to the rearrangement control threads of the PUs #1, #2, and #3 that requested instruction, notification of the completion of the copying (step S2116). The rearrangement control threads receive the notification of the completion of the copying and set the rearrangement state in the rearrangement plan table 720 to be "rearrangement completed" and the rearrangement state in the volume segment table 1000 to be blank, for the segments whose copying is completed.

Figure 24:
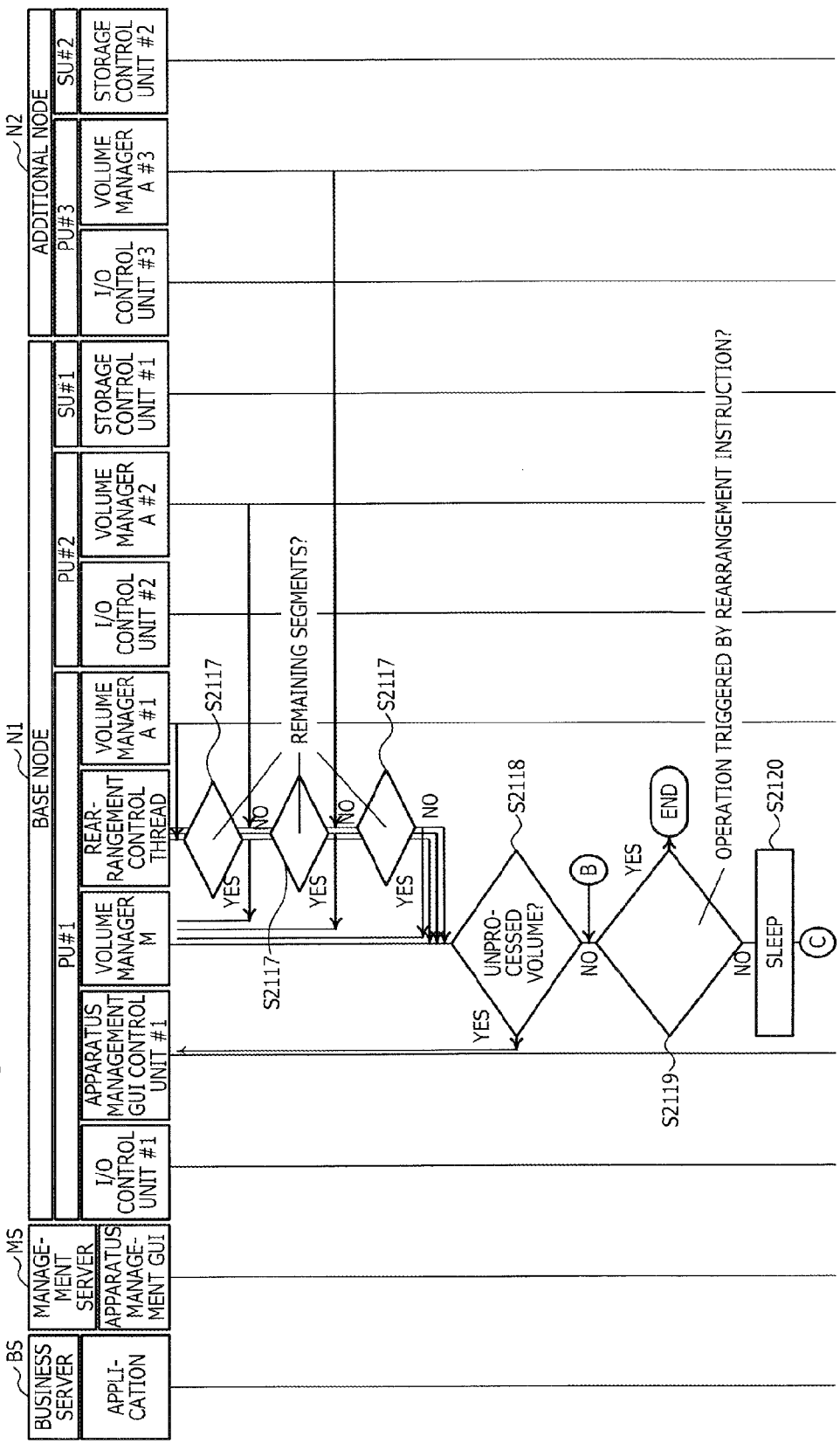

In the sequence diagram of FIG. 24, the rearrangement control threads of the PUs #1, #2, and #3 refer to the rearrangement plan table 720 and determine whether any segment remains that has not been rearranged (step S2117). If the rearrangement control threads determine that such a segment is present (step S2117: YES), the rearrangement control threads of the PUs #1, #2, and #3 return to the process at step S2110 depicted in FIG. 23.

On the other hand, if the rearrangement control threads determine that no such segment is present (step S2117: NO), the rearrangement control threads of the PUs #1, #2, and #3 notify the volume manager M of the completion of the rearrangement of the volumes. The volume manager M refers to the rearrangement plan table 720 and determines whether any unprocessed volume is present (step S2118).

If the volume manager M determines that an unprocessed volume is present (step S2118: YES), the volume manager M returns to the process at step S2109 depicted in FIG. 22. On the other hand, if the volume manager M determines that no unprocessed volume is present (step S2118: NO), the volume manager M determines whether the storage system SM has started operation triggered by the rearrangement instruction (step S2119).

If the volume manager M determines that the storage system SM has started operation triggered by the rearrangement instruction (step S2119: YES), the storage system SM causes the series of operations to come to an end. On the other hand, if the volume manager M determines that the storage system SM has started operation triggered by the scale out instruction (step S2119: NO), the volume manager M sleeps for a specific time period (step S2120) and returns to the process at step S2105 depicted in FIG. 21.

Thus, rearrangement of the volumes can be executed such that the allocated amount q of the segments of each LUN is equalized among the SUs. When the storage system SM starts operation triggered by a scale out instruction, it can be periodically determined whether any unevenness of the allocated amount q of the segments of each LUN in the storage system SM is present, and rearrangement of the volumes can be executed.

A procedure for a rearrangement suspension process for the storage system SM will be described. A procedure for the rearrangement suspension process will be described that is executed when the user of the management server MS issues a suspension instruction for the rearrangement process.

Figure 25:
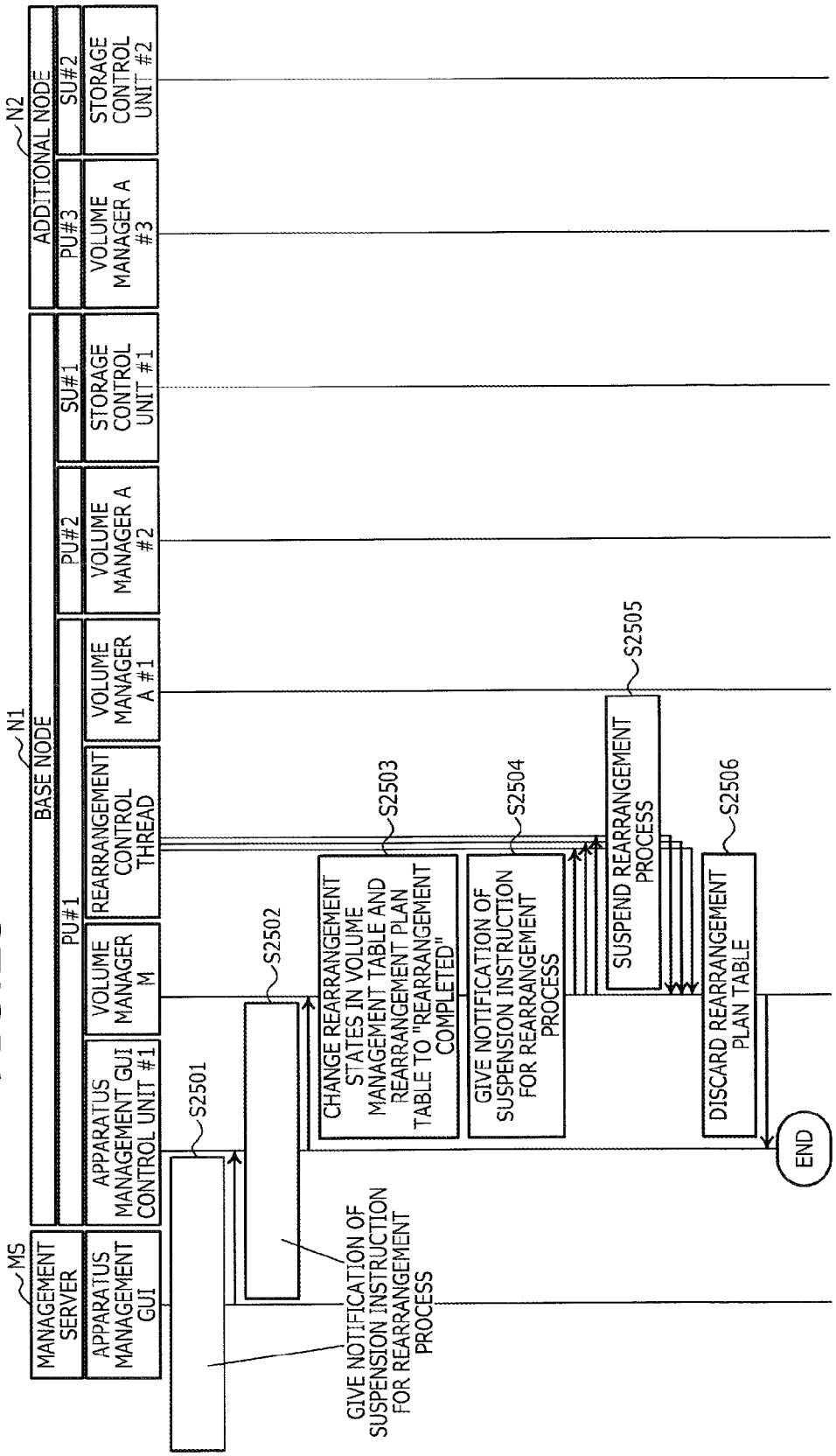
FIG. 25 is a sequence diagram of an example of a procedure for a first rearrangement suspension process for the storage system SM.

FIG. 25 is a sequence diagram of an example of the procedure for a first rearrangement suspension process for the storage system SM. In the sequence diagram of FIG. 25, when the apparatus management GUI of the management server MS receives a suspension instruction for the rearrangement process, the apparatus management GUI notifies the apparatus management GUI control unit #1 of the PU #1 of the suspension instruction for the rearrangement process (step S2501).

When the apparatus management GUI control unit #1 receives the suspension instruction for the rearrangement process, the apparatus management GUI control unit #1 notifies the volume manager M of the suspension instruction for the rearrangement process (step S2502). The volume manager M changes the rearrangement states in the volume management table 710 and the rearrangement plan table 720 to "rearrangement completed" (step S2503).

The volume manager M gives to the rearrangement control threads of the PUs #1, #2, and #3 executing the rearrangement process, notification of the suspension instruction for the rearrangement process (step S2504). The rearrangement control threads of the PUs #1, #2, and #3 suspend the rearrangement process currently under execution (step S2505). The volume manager M discards the rearrangement plan table 720 (step S2506) and the storage system SM causes the series of operations to come to an end. Thus, the user of the management server MS can suspend, at an arbitrary timing, the rearrangement process currently under execution.

A procedure will described for the rearrangement suspension process for the storage system SM executed when an event for suspension of the rearrangement occurs. An event for suspension of the rearrangement can be, for example, execution of a new scale out session, stoppage of the RAID group, and deletion of a LUN in the SU.

Figure 26:
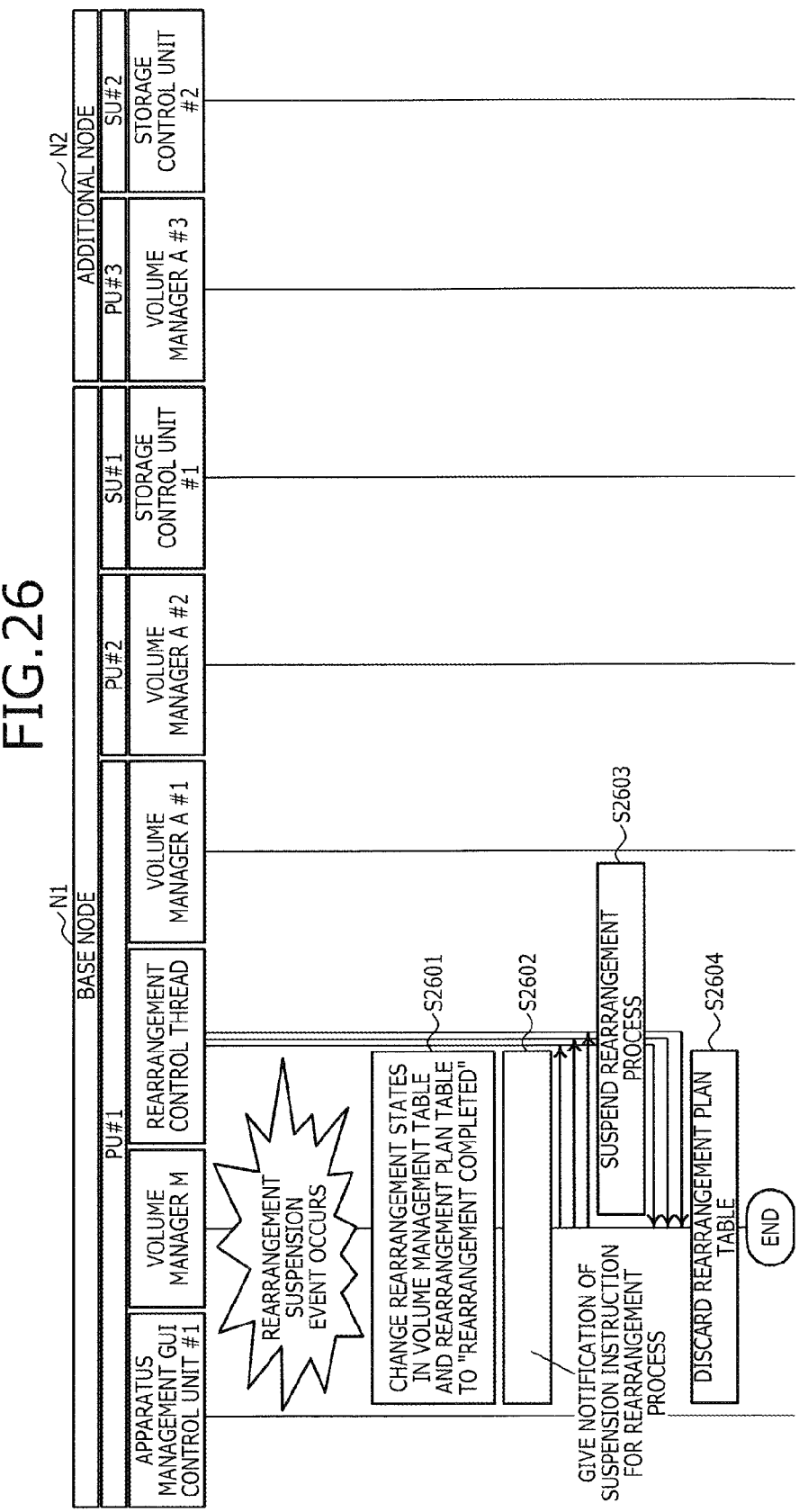
FIG. 26 is a sequence diagram of an example of a procedure for a second rearrangement suspension process of the storage system SM.

FIG. 26 is a sequence diagram of an example of a procedure for a second rearrangement suspension process of the storage system SM. In the sequence diagram of FIG. 26, when an event occurs for suspension of the rearrangement, the volume manager M changes the rearrangement states in the volume management table 710 and the rearrangement plan table 720 to "rearrangement completed" (step S2601).

The volume manager M gives to the rearrangement control threads of the PUs #1, #2, and #3 currently executing the rearrangement process, notification of the suspension instruction for the rearrangement process (step S2602). The rearrangement control threads of the PUs #1, #2, and #3 suspend the rearrangement process currently under execution (step S2603). The volume manager M discards the rearrangement plan table 720 (step S2604) and the storage system SM causes the series of operations to come to an end. Thus, when an event for suspension of the rearrangement occurs, the rearrangement process currently under execution can be suspended.

A procedure for a temporary rearrangement suspension process for the storage system SM will be described. The temporary rearrangement suspension process is executed, for example, when temporary suspension of the rearrangement process is desired consequent to maintenance and inspection, etc., of the PUs or the SUs.

Figure 27:
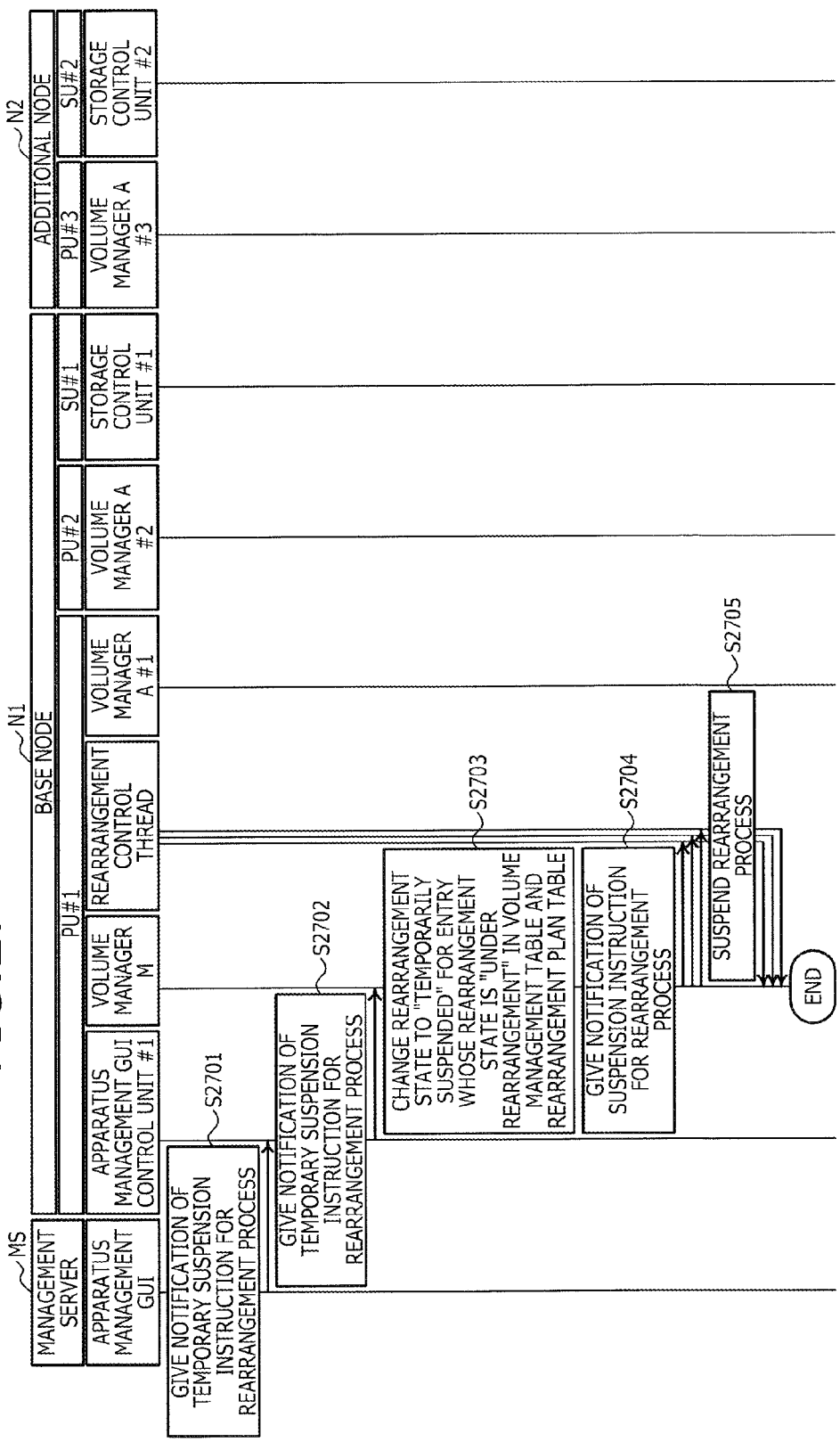
FIG. 27 is a sequence diagram of an example of a procedure for a temporary rearrangement suspension process of the storage system SM.

FIG. 27 is a sequence diagram of an example of the procedure for the temporary rearrangement suspension process of the storage system SM. In the sequence diagram of FIG. 27, when the apparatus management GUI of the management server MS receives a temporary suspension instruction for the rearrangement process, the apparatus management GUI gives to the apparatus management GUI control unit #1 of the PU #1, notification of the temporary suspension instruction for the rearrangement process (step S2701).

When the apparatus management GUI control unit #1 receives the temporary suspension instruction for the rearrangement process, the apparatus management GUI control unit #1 notifies the volume manager M of the temporary suspension instruction for the rearrangement process (step S2702). The volume manager M changes the rearrangement state to "temporarily suspended" for the entry whose rearrangement state is "under rearrangement" in each of the volume management table 710 and the rearrangement plan table 720 (step S2703).

The volume manager M gives to the rearrangement control threads of the PUs #1, #2, and #3 currently executing the rearrangement process, notification of the suspension instruction for the rearrangement process (step S2704). The rearrangement control threads of the PUs #1, #2, and #3 suspend the rearrangement process currently under execution (step S2705) and the storage system SM causes the series of operations to come to an end. Thus, at an arbitrary timing, the user of the management server MS can temporarily suspend the rearrangement process currently under execution.

A procedure for a rearrangement restart process for the storage system SM will be described. The rearrangement restart process is executed when the rearrangement is restarted after the rearrangement process is temporarily suspended consequent to maintenance and inspection, etc., of the PUs or the SUs.

Figure 28:
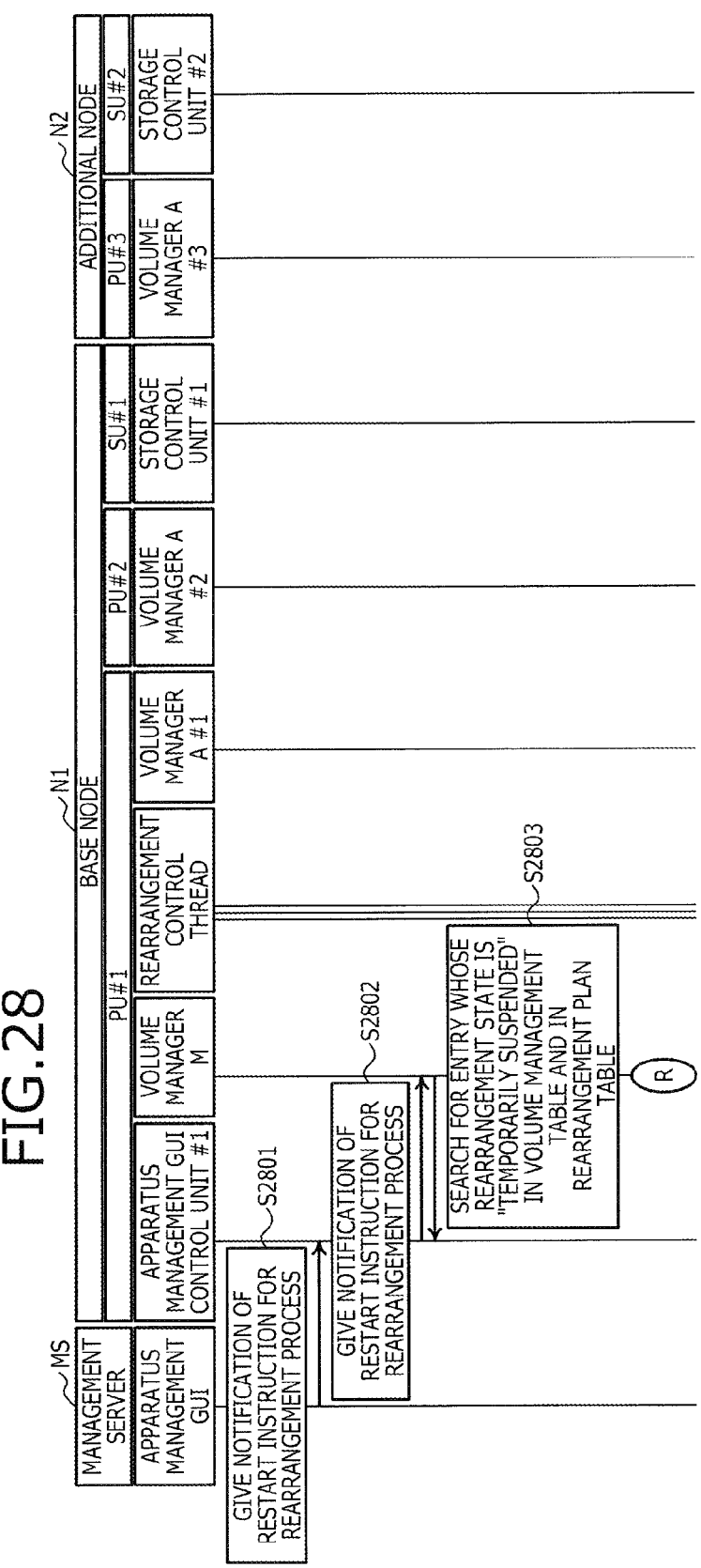
FIG. 28 is a sequence diagram of an example of a procedure for a rearrangement restart process for the storage system SM.

FIG. 28 is a sequence diagram of an example of the procedure for the rearrangement restart process for the storage system SM. In the sequence diagram of FIG. 28, when the apparatus management GUI of the management server MS receives a restart instruction for the rearrangement process, the apparatus management GUI gives to the apparatus management GUI control unit #1 of the PU #1, notification of the restart instruction for the rearrangement process (step S2801).

When the apparatus management GUI control unit #1 receives the restart instruction for the rearrangement process, the apparatus management GUI control unit #1 notifies the volume manager M of the restart instruction for the rearrangement process (step S2802). The volume manager M searches for an entry whose rearrangement state is "temporarily suspended" in both the volume management table 710 and the rearrangement plan table 720 (step S2803) and progresses to the process at step S2109 depicted in FIG. 22. Thereby, the user of the management server MS can restart the temporarily suspended rearrangement process at an arbitrary timing.

As described, according to the storage system SM according to the first example, data stored before the scale out can also be reallocated in the overall SU in the storage system SM. Thereby, improvement can be facilitated of the access performance that corresponds to the potential of the storage system SM after the scale out.

A second example of the storage system SM according to the embodiment will be described. Portions identical to those described in the first example will not again be depicted or described.

Figure 29:
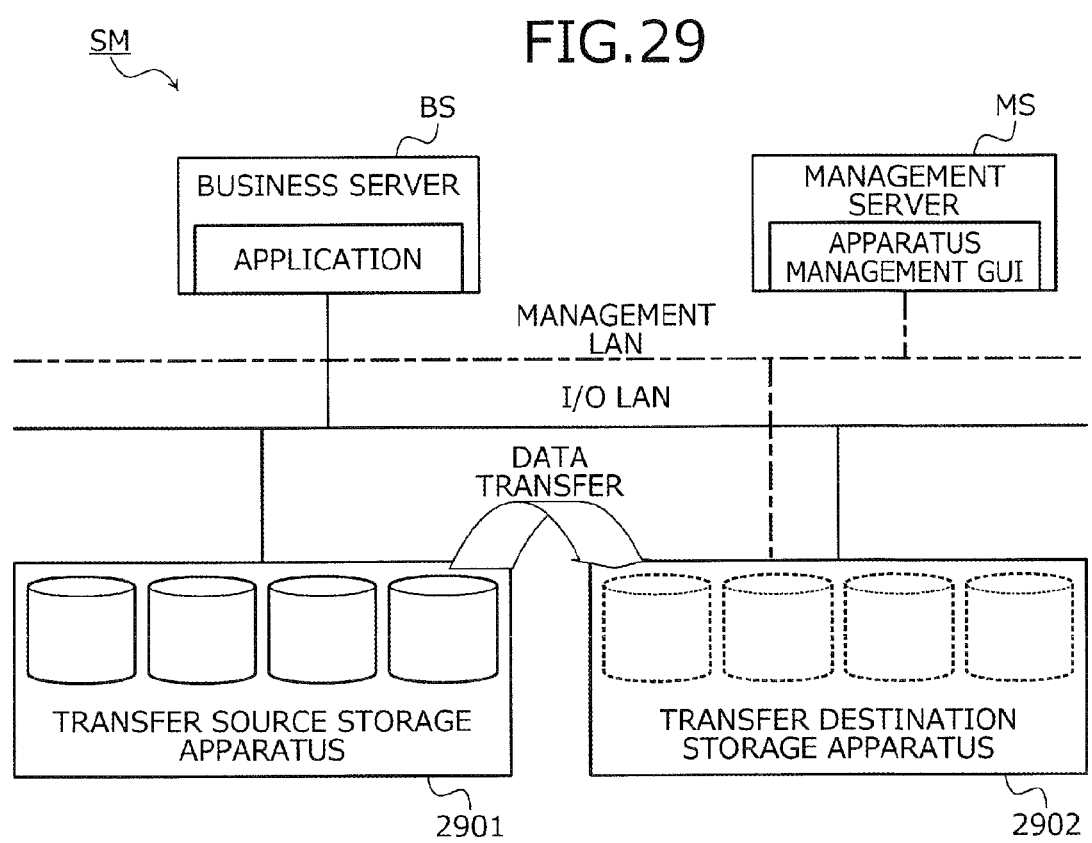
FIG. 29 is an explanatory diagram of an example of system configuration of the storage system SM according to a second example.

FIG. 29 is an explanatory diagram of an example of system configuration of the storage system SM according to the second example. In FIG. 29, the storage system SM includes a transfer source storage apparatus 2901 and a transfer destination storage apparatus 2902. The transfer destination storage apparatus 2902 corresponds to, for example, the base node N1 (or the base node N1 and the additional node N2) depicted in FIG. 7, and is connected to the business server BS. The transfer source storage apparatus 2901 and the transfer destination storage apparatus 2902 are connected to each other through, for example, an I/O LAN.

For example, a connection port of the transfer source storage apparatus 2901 for the business server BS is connected to a data transfer port of the transfer destination storage apparatus 2902. Thereby, data exchanges can be executed between the transfer source storage apparatus 2901 and the transfer destination storage apparatus 2902 without adding any special I/O port to the transfer source storage apparatus 2901.

For example, the user of the management server MS sets the volume to be transferred of the transfer source storage apparatus 2901 to be able to access the transfer destination storage apparatus 2902 such that the transfer destination storage apparatus 2902 can access the transfer source storage apparatus 2901. The transfer destination storage apparatus 2902 accesses the volume to be transferred of the transfer source storage apparatus 2901, autonomously creates a volume corresponding to the volume to be transferred in the transfer destination, and copies the pieces of data between the volumes.

The business server BS executes the business IO for the volume of the transfer destination storage apparatus 2902. If the transfer destination storage apparatus 2902 receives a read instruction for data not present in the volume of the transfer destination, the transfer destination storage apparatus 2902 reads the corresponding data from the corresponding volume of the transfer source storage apparatus 2901, transmits the data to the business server BS, and stores the data into the corresponding volume of the transfer destination storage apparatus 2902.

When the data is updated, the transfer destination storage apparatus 2902 updates the data for the volume of the transfer destination storage apparatus 2902. In this case, the transfer destination storage apparatus 2902 may reflect the data to be updated also on the transfer source storage apparatus 2901. Thereby, the data transfer is completed between the finally corresponded volumes.

Figure 30:
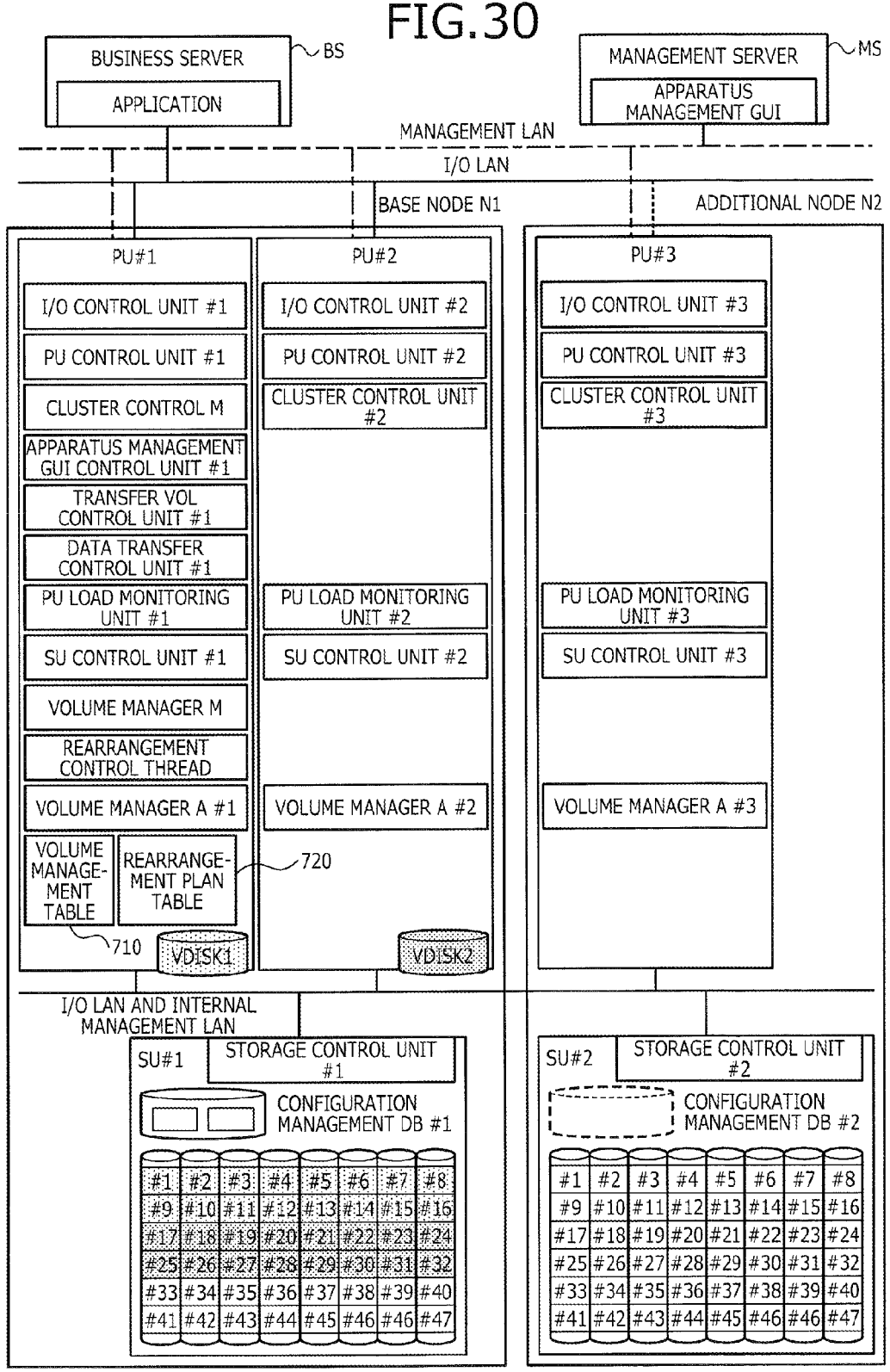
FIG. 30 is an explanatory diagram of an example of functional configuration of the PU according to the second example.

FIG. 30 is an explanatory diagram of an example of functional configuration of the PU according to the second example. In FIG. 30, the storage system SM includes the base node N1 and the additional node N2. The base node N1 includes the PUs #1 and #2, and the SU #1. The additional node N2 includes the PU #3 and the SU #2.

The PUs #1 and #2 in the base node N1, the PU #3 in the additional node N2, and the management server MS are connected to each other through the management LAN. The PUs #1 and #2 in the base node N1, the PU #3 in the additional node N2, and the business server BS are connected to each other through the I/O LAN.

The PUs #1, #2, and #3, and the SUs #1 and #2 are connected to each other through the I/O LAN and the internal management LAN. The SUs #1 and #2 respectively include the configuration management DBs #1 and #2, and the storage control units #1 and #2. The configuration management DBs #1 and #2 each include the volume management table 710 and the rearrangement plan table 720.

The PU #1 includes the I/O control unit #1, the PU control unit #1, the cluster control M, the apparatus management GUI control unit #1, a transfer VOL control unit #1, a data transfer control unit #1, the PU load monitoring unit #1, the SU control unit #1, and the volume managers M and A #1. The PU #2 includes the I/O control unit #2 , the PU control unit #2 , the cluster control unit #2 , the PU load monitoring unit #2 , the SU control unit #2 , and the volume manager A #2. The PU #3 includes the I/O control unit #3, the PU control unit #3, the cluster control unit #3, the PU load monitoring unit #3, the SU control unit #3, and the volume manager A #3.

The transfer VOL control unit #1 reads the volume information concerning the transfer source storage apparatus 2901 and creates a volume of the transfer destination. In this creation, the transfer VOL control unit #1 arranges volumes such that the number of created volumes is equalized taking into consideration, for example, the load balance among the PUs #1 to #3 and the SUs #1 and #2. When data are transferred during the rearrangement, the transfer VOL control unit #1, for example, refers to the rearrangement plan table 720 and arranges the volumes to equalize the number of created volumes. The data transfer control unit #1 controls the transfer of data between the storage apparatuses.

The contents of a transfer source/destination volume correspondence table 3100 used by the transfer destination storage apparatus 2902 will be described. The transfer source/destination volume correspondence table 3100 is information indicating which volume of the transfer destination storage apparatus 2902, a volume of the transfer source storage apparatus 2901 corresponds to. The transfer source/destination volume correspondence table 3100 is correlated with the volume management table 710 and the rearrangement plan table 720 using the volume numbers as indexes.

FIG. 31 is an explanatory diagram of an example of the contents of the transfer source/destination volume correspondence table 3100. In FIG. 31, the transfer source/destination volume correspondence table 3100 has fields for the transfer source target ID, the transfer source LUN number, the transfer source size, the transfer destination target ID, the transfer destination LUN number, and the volume number. By setting information in each of the fields, transfer source/destination correspondence information (for example, transfer source/destination correspondence information 3100-1 to 3100-*n*) is stored as records.

The transfer source target ID is an identifier of the volume of the transfer source. The transfer source LUN number is the LUN number of the volume of the transfer source. The transfer source size is the size (bytes) of the volume of the transfer source. The transfer destination target ID is an identifier of the volume of the transfer destination. The transfer destination LUN number is the LUN number of the volume of the transfer destination. The volume number is the volume (VDISK) number. The volume number may be included in the transfer destination Target ID.

The transfer destination storage apparatus 2902 makes an inquiry to the transfer source storage apparatus 2901 about the volumes that are present therein and thereby, stores the inquiry result into the transfer source/destination volume correspondence table 3100, for each volume as one entry. For example, the transfer destination storage apparatus 2902 stores into the transfer source/destination volume correspondence table 3100, the transfer destination Target ID, the transfer destination LUN number, and the volume number that correspond to the transfer source target ID, the transfer source LUN number, and the transfer source size.

When the volumes of the transfer destination are created, the volume information concerning each of the volumes is registered into the volume index table 800. As to a segment allocated to any one SU among the segments constituting the volume, segment information concerning the segment is registered into the volume segment table 1000. Therefore, when scale out is executed for the transfer destination storage apparatus 2902 during data transfer, the data are also rearranged to establish capacity balance among the real storage apparatus added by the scale out and the existing real storage.

A procedure for a data transfer process of the storage system SM according to the second example will be described. The description will be made with reference to FIGS. 32 and 33 that depict only the portions corresponding to the base node N1 as the transfer destination storage apparatus 2902.

Figure 32:
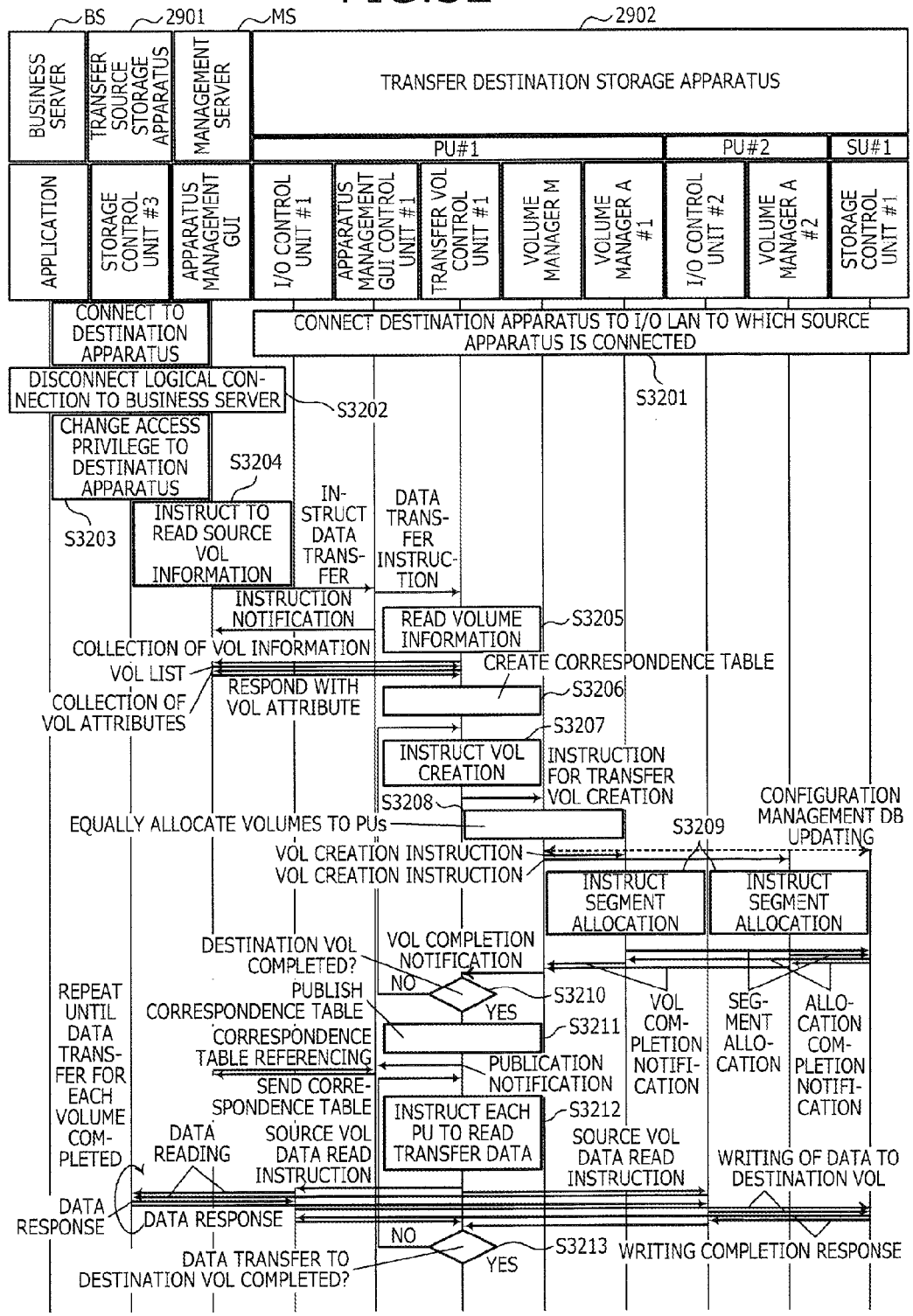
FIGS. 32 and 33 are sequence diagrams of an example of a procedure for a data transfer process of the storage system SM.
Figure 33:
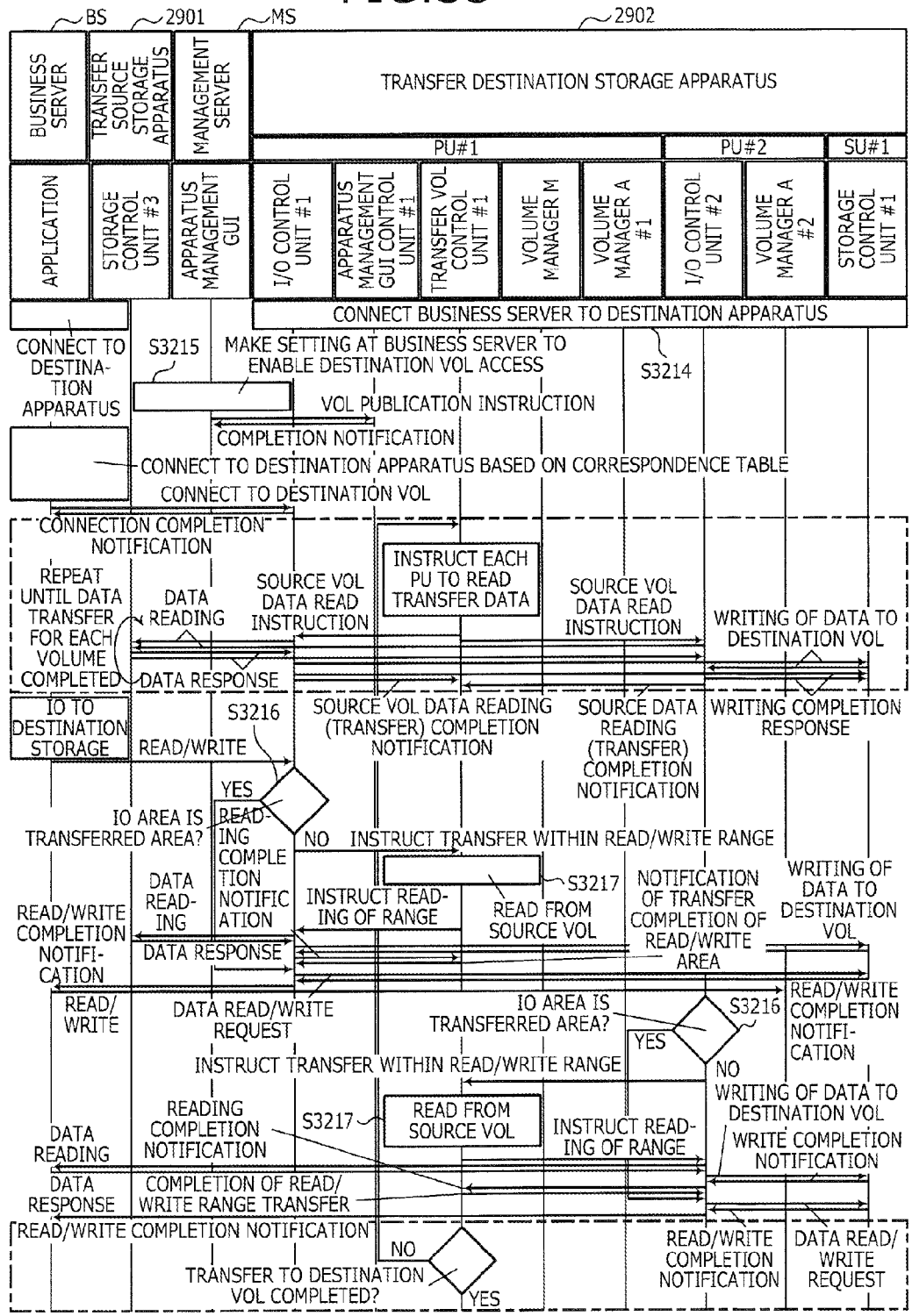

FIGS. 32 and 33 are sequence diagrams of an example of the procedure for the data transfer process of the storage system SM. In the sequence diagram of FIG. 32, the CE connects the transfer destination storage apparatus 2902 to the I/O LAN to which the transfer source storage apparatus 2901 is connected (step S3201). As a result, the storage control unit #3 of the transfer source storage apparatus 2901 connects the transfer source storage apparatus 2901 and the transfer destination storage apparatus 2902.

The CE disconnects the logical connection to the business server BS from the transfer source storage apparatus 2901 (step S3202). The storage control unit #3 of the transfer source storage apparatus 2901 changes access privilege for the volume that is to be transferred of the transfer source storage apparatus 2901, from the business server BS to the transfer destination storage apparatus 2902 (step S3203).

The management server MS instructs the transfer destination storage apparatus 2902 through the apparatus management GUI, to read the volume information of the transfer source storage apparatus 2901 (step S3204). The transfer VOL control unit #1 of the transfer destination storage apparatus 2902 reads the volume information of the transfer source storage apparatus 2901 (step S3205).

The transfer VOL control unit #1 creates the transfer source/destination volume correspondence table 3100 based on the read volume information (step S3206). In FIG. 32, the transfer source/destination volume correspondence table 3100 is simply labeled as "correspondence table". The transfer VOL control unit #1 refers to the transfer source/destination volume correspondence table 3100 and instructs the volume manager M to create a volume having the same size as that of the volume of the transfer source (step S3207).

The volume manager M evenly allocates the volumes to be created to the PUs #1 and #2 (step S3208). As a result, the volume manager M gives to the volume managers A #1 and #2 of the PUs #1 and #2, notification of a creation instruction for the volumes. The volume managers A #1 and #2 instruct the storage control unit #1 of each SU #1 to allocate the segments of the volumes to be created (step S3209).

Consequently, the storage control unit #1 of each SU #1 writes the designated segment data into the LUN #n and gives to the volume managers A #1 and #2 of the request source, notification of the allocation completion notification. The volume managers A #1 and #2 notifies the volume manager M of the VOL creation completion notification and the volume manager M notifies the transfer VOL control unit #1 of the transfer VOL creation completion notification.

The transfer VOL control unit #1 determines whether the creation of the volumes of the transfer destination has been completed (step S3210). If the transfer VOL control unit #1 determines that the creation of the volumes of the transfer destination has not been completed (step S3210: NO), the transfer VOL control unit #1 returns to the process at step S3207. On the other hand, if the transfer VOL control unit #1 determines that the creation of the volumes of the transfer destination has been completed (step S3210: YES), the transfer VOL control unit #1 publishes the transfer source/destination volume correspondence table 3100 such that the table 3100 can be referred to from the apparatus management GUI of the management server MS (step S3211).

The transfer VOL control unit #1 instructs each of the PUs #1 and #2 to which the volumes of the transfer destination are allocated, to read the data to be transferred from the transfer source storage apparatus 2901 (step S3212). As a result, the data transfer control unit #1 not depicted starts a process of reading the data from the volumes of the transfer source of the transfer source storage apparatus 2901 and writing the read data into the volumes of the transfer destination.

The data length (channel size) used in the data transfer process is, for example, 256 [KB]. However, the chunk size does not need to be fixed at 256 [KB] and may be variable in each case corresponding to the transfer efficiency, or may be a size such as 1 [MB].

The transfer VOL control unit #1 determines whether the data transfer to the volumes of the transfer destination has been completed (step S3213). If the transfer VOL control unit #1 determines that the data transfer to the volumes of the transfer destination has not been completed (step S3213: NO), the transfer VOL control unit #1 returns to the process at step S3212. On the other hand, if the transfer VOL control unit #1 determines that the data transfer to the volumes of the transfer destination has been completed (step S3213: YES), the transfer VOL control unit #1 connects the business server BS to the transfer destination storage apparatus 2901 in the sequence diagram of FIG. 33 (step S3214).

The management server MS makes a setting in the business server BS to enable access to the volumes of the transfer destination, based on the transfer source/destination volume correspondence table 3100 that can be referred to from the apparatus management GUI (step S3215). This setting refers to a setting for the business server BS to normally access the volumes (for example, a setting to recognize a device, to bundle recognized devices using a multi-path, etc.).

When the transfer destination storage apparatus 2902 receives from the business server BS, a read access for the volumes of the transfer destination in the transfer destination storage apparatus 2902, the transfer destination storage apparatus 2902 determines whether the IO area is a transferred area (step S3216). If the transfer destination storage apparatus 2902 determines that the IO area is a transferred area (step S3216: YES), the transfer destination storage apparatus 2902 reads the data from the volumes of the transfer destination and responds to the business server BS.

On the other hand, if the transfer destination storage apparatus 2902 determines that the IO area is not a transferred area (step S3216: NO), the transfer destination storage apparatus 2902 reads the data from the corresponding volumes of the transfer source storage apparatus 2901 (step S3217), writes the read data into the volumes of the transfer destination, and responds to the business server BS.

When the transfer destination storage apparatus 2902 receives from the business server BS, a write access for the volumes of the transfer destination in the transfer destination storage apparatus 2902, the transfer destination storage apparatus 2902 determines whether the IO area is a transferred area (step S3216). If the transfer destination storage apparatus 2902 determines that the IO area is a transferred area (step S3216: YES), the transfer destination storage apparatus 2902 writes the data into the volumes of the transfer destination and responds to the business server BS.

On the other hand, in a case where the transfer destination storage apparatus 2902 determines that the IO area is not a transferred area (step S3216: NO), if data complement is necessary, the transfer destination storage apparatus 2902 reads from the transfer source storage apparatus 2901, data of the portion for which the complement is necessary, merges the read data with the data from the business server BS, and writes the merged data into the volumes of the transfer destination. If the data complement is unnecessary, the transfer destination storage apparatus 2902 writes the data from the business server BS into the volumes of the transfer destination.

The data complement is necessary when the data length of the data to be written is smaller than the chunk size of 256 [KB] employed for the data transfer from the transfer source storage apparatus 2901 to the transfer destination storage apparatus 2902. The data complement is also necessary for the data areas that are not determined when the data length of the data to be written exceeds the chunk size.

As described, according to the storage system SM according to the second example, when the data is transferred, the transfer destination storage apparatus 2902 can autonomously create the volumes that correspond to the volumes of the transfer source in the transfer destination storage apparatus 2902. Thereby, when the data is transferred, the work load necessary for the data transfer can be reduced without any need to manually prepare in the transfer destination storage apparatus 2902, the volumes that correspond to the volumes of the transfer destination.

According to the storage system SM, when scale out is executed for the storage system SM during the data transfer, the data stored before the scale out and the data to be transferred can be reallocated overall in the SUs in the storage system SM. Thereby, improvement can be facilitated of the access performance that corresponds to the potential of the storage system SM after the execution of the scale out.

Although description has been made taking an example of a case where the SUs are incorporated earlier than the PUs and the PUs are incorporated later when the scale out is executed for the storage system SM, the PUs may be incorporated earlier than the SUs and the SUs may be incorporated later.

The control method described in the present embodiment may be implemented by executing a prepared program on a computer such as a personal computer and a workstation. The program is stored on a non-transitory, computer-readable recording medium such as a hard disk, a flexible disk, a CD-ROM, an MO, and a DVD, read out from the computer-readable medium, and executed by the computer. The program may be distributed through a network such as the Internet.

According to an aspect of the present embodiments, optimization of the access performance with respect to data stored before and after a system configuration change is enabled.

All examples and conditional language provided herein are intended for pedagogical purposes of aiding the reader in understanding the invention and the concepts contributed by the inventor to further the art, and are not to be construed as limitations to such specifically recited examples and conditions, nor does the organization of such examples in the specification relate to a showing of the superiority and inferiority of the invention. Although one or more embodiments of the present invention have been described in detail, it should be understood that the various changes, substitutions, and alterations could be made hereto without departing from the spirit and scope of the invention.

What is claimed is:

1. A storage system comprising:
a storage apparatus that includes:
a first storage unit that has a first storage including a plurality of first logical unit numbers (LUNs), and a first storage control unit that controls access to the first storage, and
a first control unit that controls accessible storage units including the first storage unit;
a second storage unit that has a second storage including a plurality of second LUNs, and a second storage control unit that controls access to the second storage; and
a second control unit that controls accessible storage units including the second storage unit, wherein
the first control unit includes:
a memory unit that stores allocation information including an allocation state of a plurality of segments to the first storage and the second storage, the segments constituting a volume, and
a processor that is configured to execute rearrangement control of the segments based on the allocation information corresponding to a degree of unevenness occurring between a count of segments allocated to the first storage and a count of segments allocated to the second storage, wherein
in the rearrangement control, the processor allocates, among the segments allocated to the first storage, only k−1 segments of k segments that are in an identical segment set and allocated to an identical first LUN, to k−1 first LUNs other than the identical first LUN, respectively, where k is a natural number.

2. The storage system according to claim 1, wherein the processor executes the rearrangement control for transferring a portion of segments allocated to the first storage to the second storage, when a storage capacity expansion process is executed by connecting the second storage unit and the second control unit to the storage apparatus.

3. The storage system according to claim 1, wherein the processor
calculates based on the allocation information, a difference in the count of allocated segments among the first LUNs and the second LUNs, and
determines based on the calculated difference, whether predefined unevenness is present in allocation states of the first storage and the second storage, and
executes the rearrangement control when the predefined unevenness is determined to be present.

4. The storage system according to claim 3, wherein the processor
calculates as the difference, a difference between the maximal value and the minimal value of the counts of allocated segments, and
determines that the predefined unevenness is present when the calculated difference is greater than or equal to a threshold.

5. The storage system according to claim 1, wherein the processor
creates based on the allocation information, a rearrangement plan for transferring segments between the first storage and the second storage, and
executes the rearrangement control according to the created rearrangement plan.

6. The storage system according to claim 1, wherein the processor executes the rearrangement control when a storage capacity expansion process is executed by connecting the second storage unit and the second control unit to the storage apparatus during a data transfer process from another storage unit to the first storage unit.

7. The storage system according to claim 3, wherein the processor periodically determines whether the predefined unevenness is present.

8. The storage system according to claim 1, wherein the first and the second control units are respectively connected to the first and the second storage units, and the first and the second control units are able to directly access respectively the second and the first storage units.

9. A storage apparatus that includes a first storage unit that includes a first storage including a plurality of first logical unit numbers (LUNs) and a first storage control unit that controls access to the first storage, and a first control unit that executes control of accessible storage units including the first storage unit, a second storage unit that includes a second storage including a plurality of second logical unit numbers (LUNs) and a second storage control unit that controls access to the second storage, and a second control unit that executes control of accessible storage units including the second storage unit, the storage apparatus comprising:
a memory unit that stores allocation information including an allocation state of a plurality of segments to the first storage and the second storage, the segments constituting a volume; and
a processor that is configured to execute rearrangement control of the segments based on the allocation information corresponding to a degree of unevenness occurring between a count of segments allocated to the first storage and a count of segments allocated to the second storage, wherein in the rearrangement control, the processor allocates, among the segments allocated to the first storage, only k−1 segments of k segments that are in an identical segment set and allocated to an identical first LUN, to k−1 first LUNs other than the identical first LUN, respectively, where k is a natural number.

10. A non-transitory, computer-readable recording medium storing a control program of a storage apparatus that includes a first storage unit that includes a first storage including a plurality of first logical unit numbers (LUNs) and a first storage control unit that controls access to the first storage, and a first control unit that executes control of accessible storage units including the first storage unit, a second storage unit that includes a second storage including a plurality of second logical unit numbers (LUNs) and a second storage control unit that controls access to the second storage, and a second control unit that executes control of accessible storage units including the second storage unit, the control program causing the first control unit to execute a process comprising:

acquiring allocation information including an allocation state of a plurality of segments to the first storage and the second storage, the segments constituting a volume; and executing rearrangement control of the segments based on the allocation information corresponding to a degree of unevenness occurring between a count of segments allocated to the first storage and a count of segments allocated to the second storage, wherein in the rearrangement control, the first control unit allocates, among the segments allocated to the first storage, only k−1 segments of k segments that are in an identical segment set and allocated to an identical first LUN, to k−1 first LUNs other than the identical first LUN, respectively, where k is a natural number.

11. The storage system according to claim 1, wherein the rearrangement control is executed such that counts of segments allocated to each of the first LUNs of the first storage and each of the second LUNs of the second storage are equalized.

* * * * *